(12) United States Patent
Khan et al.

(10) Patent No.: US 9,806,789 B2
(45) Date of Patent: Oct. 31, 2017

(54) APPARATUS AND METHOD FOR SPATIAL DIVISION DUPLEX (SDD) FOR MILLIMETER WAVE COMMUNICATION SYSTEM

(75) Inventors: Farooq Khan, Allen, TX (US); Zhouyue Pi, Allen, TX (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1512 days.

(21) Appl. No.: 13/078,902

(22) Filed: Apr. 1, 2011

(65) Prior Publication Data

US 2011/0243040 A1  Oct. 6, 2011

Related U.S. Application Data

(60) Provisional application No. 61/321,235, filed on Apr. 6, 2010.

(51) Int. Cl.
   H04B 7/08 (2006.01)
   H04B 7/06 (2006.01)
   (Continued)

(52) U.S. Cl.
   CPC ............ *H04B 7/086* (2013.01); *H01Q 1/242* (2013.01); *H01Q 1/246* (2013.01); *H01Q 3/28* (2013.01);
   (Continued)

(58) Field of Classification Search
   None
   See application file for complete search history.

(56) References Cited

U.S. PATENT DOCUMENTS 4,559,605 A * 12/1985 Norsworthy ................ 708/403
5,515,378 A *  5/1996 Roy, III ................ H01Q 1/246
                                                    370/334
(Continued)

FOREIGN PATENT DOCUMENTS

CN    101513110 A    8/2009
EP     1912450 A2    4/2008
(Continued)

OTHER PUBLICATIONS

T. Unger et al. "Duplex Schemes in Multiple Antenna Two-Hop Relaying", EURAS IP Journal on Advances in Signal Processing, Jan. 2008.
(Continued)

*Primary Examiner* — Hassan Kizou
*Assistant Examiner* — Roberta A Shand

(57) ABSTRACT

An apparatus and method for full-duplex millimeter wave mobile wireless communication are provided. The apparatus includes a Spatial Division Duple (SDD) mobile communication system using millimeter waves, the SDD mobile communication system including a first wireless terminal having a first transmit antenna array having a plurality of first transmit antennas for transmitting a spatially beamformed first transmit beam, and a first receive antenna array having a plurality of first receive antennas for forming a spatially beamformed first receive beam and a second wireless terminal including a second transmit antenna array having a plurality of second transmit antennas for transmitting a spatially beamformed second transmit beam directed towards a receive beam of the first wireless terminal, and a second receive antenna array having a plurality of second receive antennas for forming a spatially beamformed second receive beam directed toward the transmit beam of the first terminal.

39 Claims, 14 Drawing Sheets

(51) Int. Cl.
*H01Q 1/24* (2006.01)
*H01Q 3/28* (2006.01)
*H01Q 21/06* (2006.01)
*H01Q 25/00* (2006.01)
*H04W 88/02* (2009.01)

(52) U.S. Cl.
CPC ......... *H01Q 21/061* (2013.01); *H01Q 25/005* (2013.01); *H04B 7/0617* (2013.01); *H04W 88/02* (2013.01)

(56) References Cited

U.S. PATENT DOCUMENTS

| | | | |
|---|---|---|---|
| 6,392,595 B1* | 5/2002 | Katz et al. | 342/367 |
| 6,522,864 B1* | 2/2003 | Febvre et al. | 455/12.1 |
| 6,784,831 B1* | 8/2004 | Wang et al. | 342/357.63 |
| 6,850,502 B1* | 2/2005 | Kagan et al. | 370/330 |
| 6,904,076 B1* | 6/2005 | Tsutsui | H04B 1/71075 370/335 |
| 7,362,799 B1* | 4/2008 | Petrus | H04B 7/086 375/224 |
| 7,450,673 B2 | 11/2008 | Jin et al. | |
| 7,647,073 B2 | 1/2010 | Sung et al. | |
| 8,139,536 B2* | 3/2012 | Solomon | H04B 7/0417 370/329 |
| 8,274,937 B2* | 9/2012 | Tsai | H04B 7/0408 370/329 |
| 9,172,444 B2 | 10/2015 | Mundarath | |
| 2002/0122465 A1 | 9/2002 | Agee | H04B 1/69 375/141 |
| 2003/0220103 A1 | 11/2003 | Kim et al. | |
| 2004/0071115 A1* | 4/2004 | Earnshaw | H04B 7/10 370/335 |
| 2004/0121810 A1 | 6/2004 | Goransson et al. | |
| 2004/0203806 A1* | 10/2004 | Craig | H04W 16/10 455/450 |
| 2005/0195758 A1 | 9/2005 | Chitrapu | |
| 2006/0285604 A1 | 12/2006 | Walton et al. | |
| 2007/0243839 A1* | 10/2007 | Kostic | 455/132 |
| 2008/0013520 A1* | 1/2008 | Liu et al. | 370/347 |
| 2008/0100510 A1* | 5/2008 | Bonthron et al. | 342/373 |
| 2008/0227497 A1* | 9/2008 | Stirling-Gallacher et al. | 455/562.1 |
| 2009/0160707 A1 | 6/2009 | Lakkis | |
| 2009/0175366 A1* | 7/2009 | Maltsev | H04B 7/0634 375/260 |
| 2009/0232191 A1* | 9/2009 | Gupta | H04L 27/2096 375/216 |
| 2009/0233545 A1 | 9/2009 | Sutskover et al. | |
| 2010/0016023 A1 | 1/2010 | Yamauchi et al. | |
| 2010/0046457 A1 | 2/2010 | Abraham et al. | |
| 2010/0194629 A1* | 8/2010 | Craig et al. | 342/354 |
| 2011/0255487 A1* | 10/2011 | Jain et al. | 370/329 |
| 2012/0120925 A1* | 5/2012 | Kadous et al. | 370/336 |

FOREIGN PATENT DOCUMENTS

| | | |
|---|---|---|
| JP | 2003-037541 A | 2/2003 |
| JP | 2003-110354 A | 4/2003 |
| JP | 2007-096744 A | 4/2007 |
| JP | 2008-178651 A | 8/2008 |
| JP | 2010-060356 A | 3/2010 |
| RU | 2238611 C1 | 10/2004 |
| WO | 95-06365 A1 | 3/1995 |
| WO | 2004-057775 A1 | 7/2004 |
| WO | 2006-138623 A2 | 12/2006 |
| WO | 2009-114631 A1 | 9/2009 |

OTHER PUBLICATIONS

A New Duplex without Loss of Data Rate and Utilizing Selection Diversity, Vehicular Technology Conference, 2008. May 14, 2008, IEEE, pp. 1519-1523.

Space division duplex(SDD) system using smart antenna, Antenna Technology: Small Antennas and Novel Metamaterials, 2005. IWAT 2005. Mar. 9, 2005, IEEE, pp. 483-488.

Farooq Khan & Jerry Pi, Millimeter-wave Mobile Broadband: Unleashing 3 -300GHz Spectrum, Mar. 28, 2011, pp. 52.

Harri Holma and Antti Toskala, WCDMA for UMTS: Radio Access for Third Generation Mobile Communications, Third Edition, 2004, pp. 411-412.

Jingon Joung and Ali H. Sayed, Design of Half- and Full- Duplex Relay Systems Based on the MMSE Formation, 2009, pp. 281-284, Department of Electrical Engineering, UCLA, Los Angeles, CA 90095.

Timo Unger et al, "Duplex Schemes in Multiple Antenna Two-Hop Relaying", EURASIP Journal on Advances in Signal Processing, XP055109725, vol. 2008, No. 1, Jan. 1, 2008.

"IEEE Standard for Information technology—Telecommunications and information exchange between systems—Local and metropolitan area networks—Specific requirements. Part 15.3: Wireless Medium Access Control (MAC) and Physical Layer (PHY) Specifications for High Rate Wireless Personal Area Networks", IEEE Standard, IEEE, XP017604237, pp. c1-c187, Oct. 12, 2009, Piscataway, NJ, USA.

Mikael Sternad et al, "The WINNER B3G System MAC Concept", 2006 IEEE 64th Vehicular Technology Conference, VTC 2006-FALL, XP031051632, pp. 1-5, Sep. 25-28, 2006, Montreal, Quebec, Canada.

\* cited by examiner

APPARATUS AND METHOD FOR SPATIAL DIVISION DUPLEX (SDD) FOR MILLIMETER WAVE COMMUNICATION SYSTEM

CROSS-REFERENCE TO RELATED APPLICATION

This application claims the benefit under 35 U.S.C. §119(e) of a U.S. Provisional application filed on Apr. 6, 2010 in the U.S. Patent and Trademark Office and assigned Ser. No. 61/321,235, the entire disclosure of which is hereby incorporated by reference.

BACKGROUND OF THE INVENTION

1. Field of the Invention

The present invention relates to an apparatus and method for Spatial Division Duplex (SDD) for a millimeter wave communication system. More particularly, the present invention relates to an apparatus and method for a SDD communication system utilizing millimeter electromagnetic waves for peer-to-peer (P2P) wireless communication.

2. Description of the Related Art

Mobile communication has continued to advance in recent years, with the number of subscribers to mobile communication services now exceeding 4.5 billion and continuing to grow. At the same time, new mobile communication technologies and systems have been developed to satisfy increasing needs and to provide more and better mobile communication applications and services to mobile communication users. Examples of such systems include Code Division Multiple Access 2000 (CDMA2000) Evolution Data Optimized (EvDO) systems developed by the 3$^{rd}$ Generation Partnership Project 2 (3GPP2), and Wideband CDMA (WCDMA), High Speed Packet Access (HSPA), and Long Term Evolution (LTE) systems developed by the 3$^{rd}$ Generation Partnership Project (3GPP), and mobile Worldwide Interoperability for Microwave Access (WiMAX) systems developed by the Institute of Electrical and Electronics Engineers (IEEE). As more and more people become users of mobile communication systems, and more data-rich services are provided over these systems, there is an increasing need of a mobile communication system with larger capacity, higher throughput, lower latency, and better reliability.

Millimeter waves are radio waves, with a radio frequency range of 30 GHz-300 GHz, that exhibit unique propagation characteristics due to their smaller wavelengths. For example, more antennas can be packed in a relatively small area, thus enabling a high-gain antenna in small form factor. Millimeter wave wireless communication systems have achieved 10 Gbps data transfer rates over distances of several kilometers. However, the current technologies are not well suited for commercial mobile communication due to issues such as cost, complexity, power consumption, and form factor. Recently, research efforts have been made to utilize the millimeter wave wireless communication systems for short-range wireless communication. For example, progresses in developing 60 GHz Radio Frequency Integrated Circuits (RFIC) and antenna solutions has been achieved, however the 60 GHz RFIC today still suffers from low efficiency and high cost and millimeter waves suffer from propagation loss.

In order to address the propagation loss of millimeter waves, beamforming can be employed. Beamforming is a signal processing technique used for directional signal transmission or reception using special selectivity through adaptive receive/transmit beam patterns in order to achieve a signal gain. When transmitting, a beamformer controls a phase and relative amplitude of a signal at each transmitter antenna in order to create a pattern of constructive and destructive interference in a wavefront. When receiving, information from different antennas is combined so that an expected pattern of radiation is preferentially observed.

FIG. 1 illustrates transmit beam forming according to the related art.

Referring to FIG. 1, a transmitter 100, having multiple transmit antennas 102 in a transmit antenna array 101, is shown.

A transmit beamforming weight, gti, which is shown in FIG. 1 as gain gt1 to gtN, is applied to the signal transmitted from an i$^{th}$ one of the transmit antennas 102 of the antenna array 101. The gain is used to adjust a phase and relative amplitude of the signal transmitted from each of the transmit antennas 102. The signal can be amplified separately for transmission from each of the transmit antennas 102. Alternatively, a single amplifier or amplifiers numbering less than the number of transmit antennas can be used. Moreover, the beamforming weights or gains can be applied before signal amplification or after signal amplification.

FIG. 2 illustrates receive beam forming according to the related art.

Referring to FIG. 2, a receiver 200, having multiple receive antennas 202 in a receive antenna array 201, is shown.

The signal received by each of the receive antennas 202 is amplified by a Low-Noise Amplifier (LNA). A receive beamforming weight, gri, which is shown in FIG. 2 as gr1 to grN, is applied to the signal received and amplified from the ith one of the receive antennas 202. The gain is used to adjust a phase and relative amplitude of the signal received by each of the receive antennas 202. The receive beamforming weight may be a gain adjustment. The phase and amplitude adjusted signals are combined to produce the received signal. The receive beamforming gain is obtained because of coherent or constructive combining of the signals from each of the receive antennas 202.

FIG. 3 illustrates dynamic beamforming according to the related art.

Referring to FIG. 3, a plurality of weights gt1 to gt5 are applied to outgoing signal s(t) to form the equiphase wavefront of a transmit beam TxB.

The weights gt1 to gt5 are only used to control and/or adjust a phase of the signal s(t). The signal s(t) is applied to a plurality of antennas A1 to A5, with each antenna having a corresponding one of the weights gt1 to gt5, and each of the antennas A1 to A5 being spaced apart from adjacent ones of the antennas A1 to A5 by a distance d. For example, as shown in FIG. 3, the signal s(t) is applied to antenna A1, having the weight gt1 of $e^{+j(2\mu/\lambda)2d\cos\theta}$ which is applied to signals transmitted through the antenna A1, in order to steer the signal s(t) with respect to its phase. The weights gt2 to gt5 are respectively applied to the signal s(t) at the antennas A2 to A5. Thus, each of the antennas A1 to A5 produces a phase adjust signal s(t) that may be steered in a particular direction having the equiphase wavefront shown in FIG. 3. The phase adjustment applied to the antennas A1 to A5 using the weights gt1 to gt5 may be applied to both a transmitting and a receiving of the signal s(t) so that a transmit beam and a receive beam may be steered in a predetermined direction.

FIG. 4 illustrates an example of digital beamforming according to the related art.

Referring to FIG. 4, digital beamforming may be used to achieve various benefits, such as performance and flexibility, as performed by a transceiver 400. As shown in FIG. 4, M, N number of signals, including signals $s_0(t)$ to $s_{(M-1)}t$, are transmitted along respective transmission paths to be transmitted by respective antennas of the transceiver 400. Transmit weights $wt_0$ to $wt_{(M-1)}$ are respectively applied to the signals $s_0(t)$ to $s_{(M-1)}t$ along the respective transmission paths, each including a respective Digital to Analog Converter (DAC) DAC1 to DACM. The transmitted signals $s_0(t)$ to $s_{(M-1)}t$ are received by respective ones of antennas of the receiver 200. Received signals $r_0(t)$ to $r_{(N-1)}t$ are received through respective reception paths, each having a Low Noise Amplifier (LNA) and an Analog to Digital Converter (ADC) ADC1 to ADCN. Receive weights $wr_0$ to $wr_{(N-1)}$ are respectively applied to the received signals $r_0(t)$ to $r_{(N-1)}t$. Thus, by applying digital beamforming to digital signals, optimal channel capacity may be achieved, even under variable channel conditions. However, a large amount of hardware is used in digital beamforming by having M or N full transceivers. Thus, digital beamforming improves channel capacity while increasing both hardware complexity and power consumption.

FIG. 5 illustrates an example of analog beamforming according to the related art.

Referring to FIG. 5, analog beamforming is performed by a transceiver 500. According to the analog beamforming of FIG. 5, a number of data converters, such as the DACs and the ADCs shown in FIG. 4, can be reduced. As shown in FIG. 5, in the transceiver 500, a transmit signal s(t) passes through a DAC 501 to convert a digital form of the transmit signal s(t) into an analog form of the transmit signal s(t), which is then provided to a plurality of transmit antennas 503 along corresponding signal paths. Respective transmit weights $wt_0$ to $wt_{(M-1)}$ are applied to the respective analog signal s(t) passing through the corresponding signal paths, each having a mixer, to the transmit antennas. The transceiver 500 receives the respective analog signals s(t) having the respective transmit weights $wt_0$ to $wt_{(M-1)}$ using a plurality of receive antennas 504. A plurality of received signals pass through respective signal paths, each having an LNA, a mixer, and respective receive weights $wr_0$ to $wr_{(N-1)}$ are applied to the plurality of received signals. The weighted received signals are then converted into a digital signal by an ADC 502 to form a receive signal r(t). Accordingly, in the analog beamforming of FIG. 5 only one DAC 501 and one ADC 502 is used in the transceiver 500, thus reducing a number of data converters.

FIG. 6 illustrates an example of Radio Frequency (RF) beamforming according to the related art.

Referring to FIG. 6, RF beamforming is performed by a transceiver 600. As shown in FIG. 6, RF beamforming may reduce a number of mixers used to perform the beamforming operations. In the transceiver 600, a transmit signal s(t) is converted from a digital form into an analog form using the DAC 601. The analog form of the transmit signal s(t) is then passed through a mixer 602 in order to be provided to a plurality of transmit antennas 603 along respective signal paths in order to be transmitted. The transceiver 600 receives the transmitted signals using a plurality of receive antennas 604, each having a respective signal path including an LNA and respective receive weights $wr_0$ to $wr_{(N-1)}$ applied to the plurality of received signals. The weighted received signals are combined by combiner 605 and then mixed by mixer 606 and passed through an ADC 607 to form the received signal r(t). Thus, a mixer is not disposed along each of the signal paths of the receive antennas 604, and a lower number of mixers results in decreased hardware complexity and power consumption. However, a reduced flexibility in beamforming control, decreased multiple access functionality and decreased multiple access users result in limited functionality of RF beamforming.

Current peer-to-peer (P2P) millimeter wave standards, such as WirelessHD technology, ECMA-387, and IEEE 802.15.3c employ Time Division Duplex (TDD), wherein only one of the two devices in communication transmits or receives at a given time. TDD or Frequency Division Duplex (FDD) are often used to separate the transmitted signals and received signals of base stations in conventional cellular or mobile broadband systems. In conventional TDD systems, base stations transmit in downlink time slots and mobile stations transmit in the uplink time slots. Consequently, current millimeter wave standards only support half-duplex communications. In other words, simultaneous transmit and receive operations are not possible in current P2P millimeter wave standards for wireless communication.

SUMMARY OF THE INVENTION

Aspects of the present invention address at least the above-mentioned problems and/or disadvantages and provide at least the advantages described below. Accordingly, an aspect of the present invention is to provide an apparatus and method for Spatial Division Duplex (SDD) for a millimeter wave communication system.

In accordance with an aspect of the present invention, a wireless terminal for a full-duplex millimeter wave communication system is provided. The apparatus includes a transmit antenna array having a plurality of transmit antennas for forming a spatially beamformed transmit beam, and a receive antenna array having a plurality of receive antennas for forming a spatially beamformed receive beam, wherein the plurality of transmit antennas and the plurality of receive antennas use a same frequency at a same time for a communication signal of the respective transmit and receive beams and wherein the beamformed transmit beam and the beamformed receive beam do not spatially overlap.

In accordance with another aspect of the present invention, a Spatial Division Duple (SDD) mobile communication system using millimeter waves is provided. The apparatus includes a first wireless terminal including a first transmit antenna array having a plurality of first transmit antennas for transmitting a spatially beamformed first transmit beam, and a first receive antenna array having a plurality of first receive antennas for forming a spatially beamformed first receive beam, and a second wireless terminal including a second transmit antenna array having a plurality of second transmit antennas for transmitting a spatially beamformed second transmit beam directed towards a receive beam of the first wireless terminal, and a second receive antenna array having a plurality of second receive antennas for forming a spatially beamformed second receive beam directed toward a transmit beam of the first wireless terminal.

In accordance with another aspect of the present invention, a method for providing Spatial Division Duplex (SDD) mobile communications using millimeter waves is provided. The method includes forming a first transmit beam using selected ones of a plurality of transmit antennas of a transmit antenna array, transmitting a first signal to a first wireless terminal via the first transmit beam according to a predetermined frequency at a predetermined time, forming a first receive beam using selected ones of a plurality of receive antennas of a receive antenna array, and receiving a second signal from a second wireless terminal via the first receive beam according to the predetermined frequency at the predetermined time, wherein each of the first transmit beam and the first receive beam are spatially beamformed, and wherein the spatially beamformed transmit beam and the spatially beamformed receive beam do not spatially overlap.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
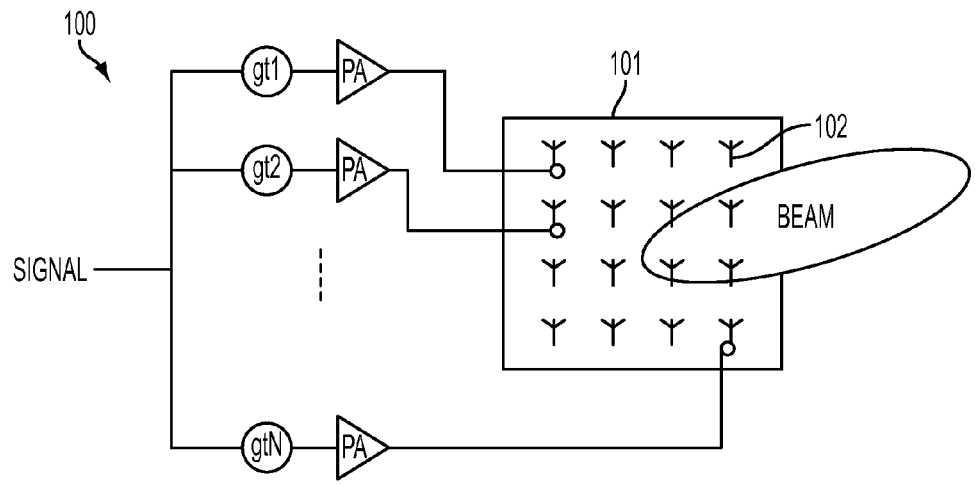
FIG. 1 illustrates transmit beamforming according to the related art.
Figure 2:
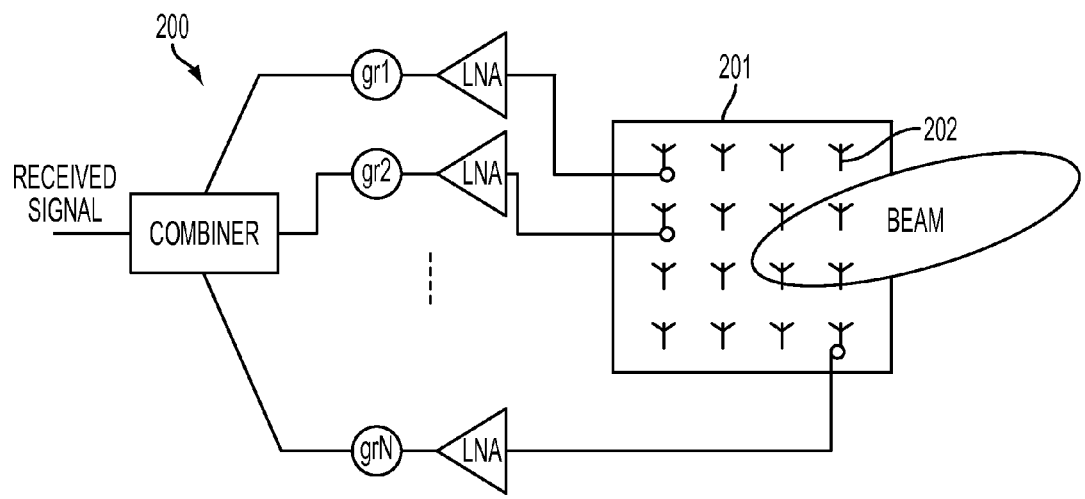
FIG. 2 illustrates receive beamforming according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention may be described as applied to a "mobile station." However, it is to be understood that this is merely a generic term and that the invention is equally applicable to any of a mobile phone, a palm sized Personal Computer (PC), a Personal Digital Assistant (PDA), a Hand-held PC (HPC), a smart phone, an International Mobile Telecommunication 2000 (IMT-2000) terminal, a wireless Local Area Network (LAN) terminal, a repeater, a transceiver, and any other suitable wireless communication device that transmits and/or receives wireless or radio frequency signals for communication. In addition, exemplary embodiments of the present invention may be described as applied to a "base station." However, it is to be understood that this is merely a generic term and that the invention is equally applicable to any of a base station, an evolved Node B (eNB), a repeater, an wireless network element, a transceiver, an access point, and any other suitable wireless communication device that transmits and/or receives wireless or radio frequency signals for communication. Accordingly, use of the term "mobile station" and "base station" should not be used to limit application of the present inventive concepts to any certain type of apparatus or device. The term "wireless terminal" is a generic term that refers to any one of a base station and a mobile station. The term "wireless terminal" and "terminal" may be interchangeably referred to herein.

Exemplary embodiments of the present invention include an apparatus and method for a Spatial Division Duplex (SDD) communication system that utilize millimeter electromagnetic waves for wireless communication.

The SDD communication systems and methods of the various embodiments disclosed herein is presented within the context of wireless communication utilizing millimeter waves. However, the present invention is not limited thereto, and the SDD communication systems and methods are applicable to other suitable communication mediums, such as radio waves with frequency of 10 GHz-30 GHz, other similar communication mediums exhibiting properties similar to millimeter waves, or electromagnetic waves with terahertz frequencies, infrared, visible light, and other optical media. In the present exemplary embodiments, the terms "cellular band" refers to frequencies around a few hundred megahertz to a few gigahertz and "millimeter wave band" refers to frequencies around a few tens of gigahertz to a few hundred gigahertz.

Millimeter waves suffer higher propagation loss than radio waves having lower frequencies. This higher propagation loss may become more pronounced when millimeter waves are utilized for local-area communication, for example a range of 10 m to 100 m, or for wide-area communication, in a range of greater than 100 m. In order to overcome the higher propagation loss, antennas having high antenna gains are used in millimeter wave communication. Due to the small wavelength of millimeter waves (e.g., λ=5 mm for a 60 GHz carrier frequency), in an antenna array having multiple antennas, an antenna size and separation can be small, for example the antenna size and separation may be λ/2, for the purpose of beamforming. The small antenna size and separation of millimeter wave antennas allows for a large number of antennas in a small area. The large number of small antennas in a small area enables high-gain of antenna beams in a relatively small area. The large number of antennas and high-gain of antenna beams allows for narrow antenna beams. These characteristics of millimeter wave antennas allow for implementation of technologies such as Spatial Division Multiple Access (SDMA) and spatial reuse.

Figure 7:
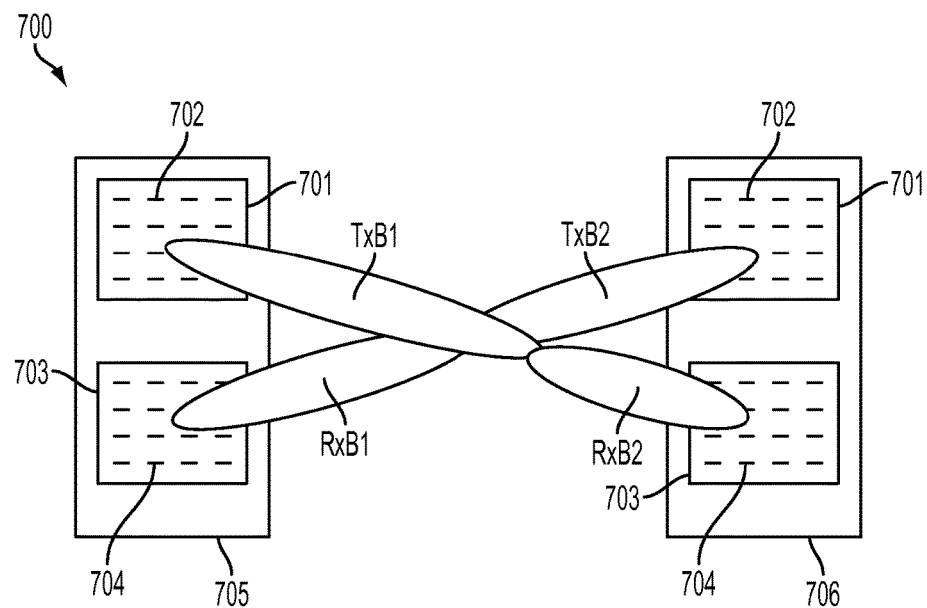
FIG. 7 illustrates a full-duplex millimeter wave peer-to-peer (P2P) communication system according to an exemplary embodiment of the present invention.

FIG. 7 illustrates a full-duplex millimeter wave peer-to-peer (P2P) communication system according to an exemplary embodiment of the present invention.

Referring to FIG. 7, a full-duplex millimeter wave peer-to-peer (P2P) communication system 700 includes terminals 705 and 706, each having a transmit antenna array 701 including multiple transmit antennas 702 and a receive antenna array 703 including multiple receive antennas 704. The terminal 705 engages in bi-directional communication with terminal 706. In other words, both terminal 705 and terminal 706 transmit and receive data simultaneously on a same frequency at a same time. However, the present invention is not limited thereto, and the terminal 705 and the terminal 706 may transmit and receive data on different frequencies and at different times, or communicate via other suitable methods.

The terminals 705 and 706 utilize spatial beamforming when transmitting and receiving data in order to separate transmit and receive signals. The respective transmit antennas 702 and the respective receive antennas 704 of each of the terminals 705 and 706 each have L number of antennas disposed in a first direction and N number of antennas disposed in a second direction perpendicular to the first direction in order to form an L by N matrix of antennas. Also, the respective transmit antennas 702 and the respective receive antennas 704 of each of the terminals 705 and 706 are separated from each other in order to transmit and receive the separated transmit and receive signals. Terminal 705 transmits data to terminal 706 via a transmit beam TxB1 that is formed in a direction towards receive antennas 704 of terminal 706. Terminal 706 receives data by enabling a receive beam RxB2 that is formed in a direction towards the transmit antennas 702 of terminal 705 in order to receive the signal of the transmit beam TxB1.

The terminals 705 and 706 may be at least one of wireless base station, or a wireless network repeater or other wireless network element, a mobile terminal, a transceiver, or any other suitable wireless communication device that transmits and receives wireless or radio frequency signals for communication.

Simultaneous to the transmission of the transmit signal TxB1 from terminal 705 to terminal 706, a transmit signal may be transmitted from terminal 706 to terminal 705 via transmit beam TxB2, as shown in FIG. 7. Terminal 706 transmits data to terminal 705 via the transmit beam TxB2 formed in a direction towards the receive antennas 704 of terminal 705. Terminal 705 receives data by enabling a receive beam RxB1 formed in a direction towards the transmit antennas 702 of the terminal 706 in order to receive the transmit beam TxB2.

In order to support full-duplex P2P communication, the transmit antennas 702, as well as other transmission circuitry and elements, such as a power amplifier, an up-conversion mixer, and other transmission circuitry and elements, and the receive antennas 704, as well as other receive circuitry, such as an LNA, a down conversion mixer, or other receive circuitry and elements, within the respective terminals 705 and 706, should be separated from each other. For example, within terminal 705, as shown in FIG. 7, the separation between the transmission circuits and the receive circuits are separated from each other. Accordingly, when performing transmit and receive beamforming, interference between the transmission circuitry and the receive circuitry of terminal 705 may be suppressed due to the separation. The suppression of interference enables the terminal 705 to use the same time and frequency resources for the transmit beam TXB1 and the receive beam RXB1 and their corresponding transmit and receive signals. However, the present invention is not limited thereto, and due to the separation between the transmission and receive circuitry, in performing the transmit and receive beamforming, a same timing using adjacent frequencies or two sets of frequencies that are very close to each other may be used.

Figure 8:
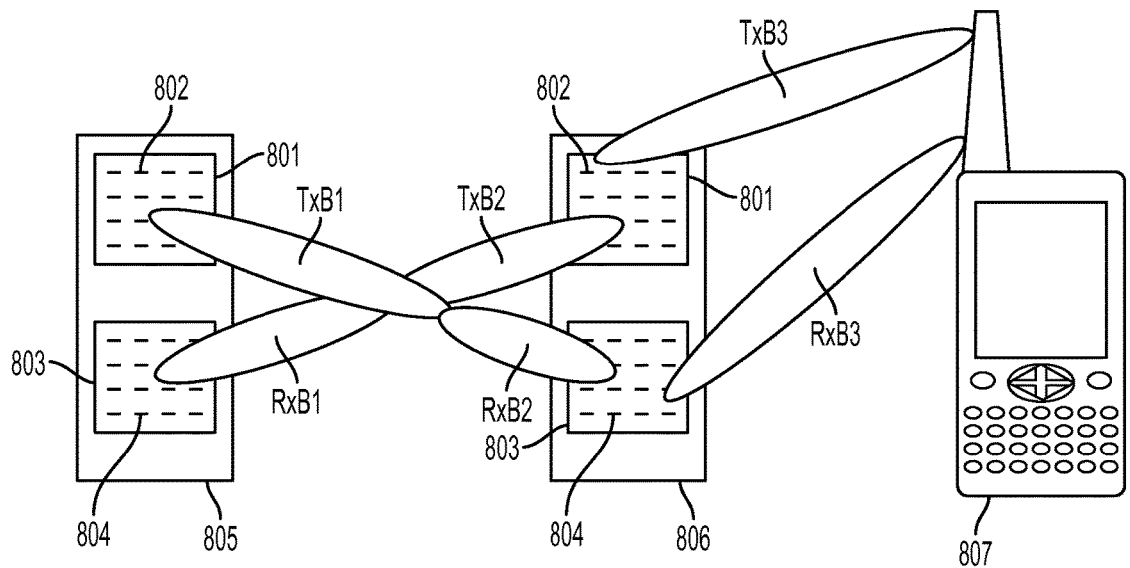
FIG. 8 illustrates a full-duplex millimeter wave wireless communication system according to an exemplary embodiment of the present invention.

FIG. 8 illustrates a full-duplex millimeter wave wireless communication system according to an exemplary embodiment of the present invention.

Referring to FIG. 8, a full-duplex millimeter wave P2P communication system 400 includes terminals 805 and 806, each having a transmit antenna array 801 including multiple transmit antennas 802 and a receive antenna array 803 including multiple receive antennas 804. Similar to the exemplary embodiment described with reference to FIG. 7, the terminal 805 engages in bi-directional communication with terminal 805 utilizing spatial beamforming when transmitting and receiving data in order to separate transmit and receive signals through respective transmit and receive beams. The respective transmit antennas 802 and the respective receive antennas 804 of each of the terminals 805 and 806 are separated from each other in order to transmit and receive the separated transmit and receive signals. The terminals 805 and 806 transmit and receive data to and from each other in a manner similar to that as described above with reference to FIG. 7.

Simultaneous to the communication between the terminals 805 and 806, the terminal 806 may communicate with wireless terminal 807. The terminal 806 transmits data to the wireless terminal 807 via transmit beam TxB3 that is formed in a direction towards the wireless terminal 807. The terminal 806 receives data from the wireless terminal 807 by enabling a receive beam RxB3 formed in a direction towards the wireless terminal 807 in order to receive the data transmitted by the wireless terminal 807. The wireless terminal 807 may be a wireless communication system end user device, such as a mobile or wireless phone, a wireless personal digital assistant, a mobile computer, or other similar wireless electronic devices.

The terminal 806 may communicate with the wireless terminal 807 using the same frequency and time used to communicate with the terminal 805. The terminal 806 performs a beamforming operation on the transmit beam TxB3 and the receive beam RxB3. The beamforming operation performed by the terminal 806 spatially separates the transmit beam TxB2 from the transmit beam TxB3 when both beams are simultaneously being transmitted from the terminal 806 to the respective recipients, the terminal 805 and the wireless terminal 807.

The terminal 806 may only use selected ones of the respective transmit antennas 802 in order to perform the beamforming operation for transmission. For example, different ones of the transmit antennas 802, that are spatially separated from each other, may be used to respectively form the transmit beams TxB2 and TxB3. Similarly, selected ones of the respective receive antennas 804 are used to form the receive beams RxB2 and RxB3 in order to perform the beamforming operation for reception. Different and spatially separated ones of the receive antennas 804 may be used to respectively form the receive beams RxB2 and RxB3. However, the present invention is not limited thereto, and spatial beamforming may not be utilized and other suitable means of transmitting and receiving data from and to the terminal 806 may be used.

Figure 9:
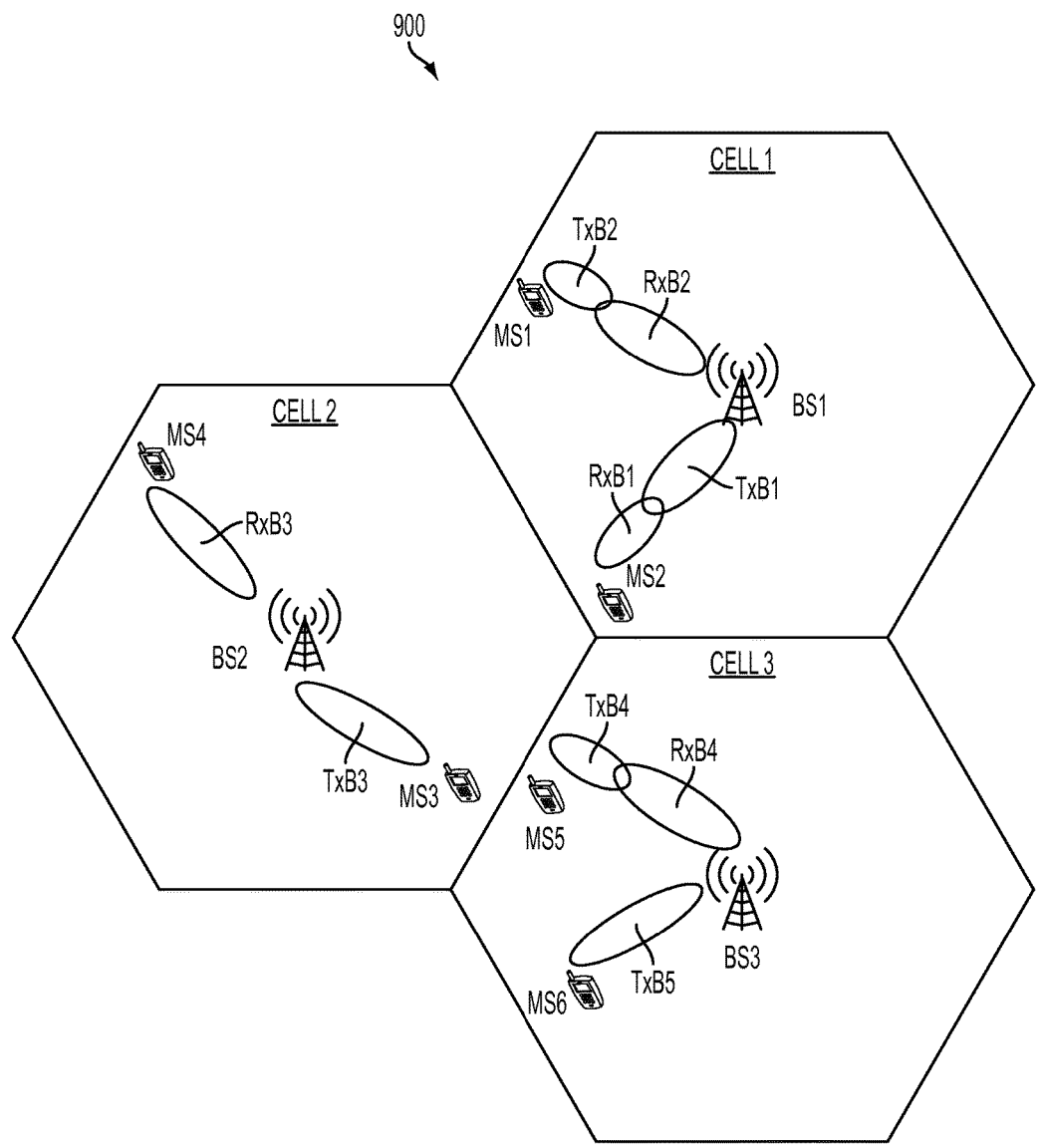
FIG. 9 illustrates a SDD millimeter wave mobile communication system according to an exemplary embodiment of the present invention.

FIG. 9 illustrates a SDD millimeter wave mobile communication system according to an exemplary embodiment of the present invention.

Referring to FIG. 9, a SDD millimeter wave mobile communication system, or in other words a SDD wireless communication system 900, is shown in FIG. 9. The SDD wireless communication system 900 comprises three base stations BS1, BS2 and BS3, and six mobile stations MS1, MS2, . . . , MS6. Each of the three base stations BS1, BS2 and BS3 have a corresponding communication area, or cells 101 to 103, in which the mobile stations MS1 to MS6 are located in. However, the present invention is not limited thereto, and the SDD wireless communication system 400 may vary in numbers of the base stations and mobile stations.

As shown in FIG. 9, base station BS1 communicates with mobile stations MS1 and MS2, base station BS2 communicates with mobile stations MS3 and MS4 and base station BS3 communicates with mobile stations MS5 and MS6. Base station BS1 simultaneously transmits data to mobile station MS1 and receives data from mobile station MS2 on a same frequency at a same time. In other words, the base station BS1 uses the same frequency to communicate with two different mobile stations, MS1 and MS2, at a concurrent time. However, in order to communicate with the mobile station MS1 at the same time as communicating with the mobile station MS2, the base station BS1 must separate the respective transmit and receive signals.

A separation between transmit and receive signals is achieved by spatial beamforming, thus allowing for SDD wireless communication. In order to perform spatial beamforming, each of the base stations BS1 to BS2 is provided with a set of transmit antennas that is separate from a set of receive antennas. The transmit antennas, as well as other transmission circuitry and elements, such as a power amplifier, an up-conversion mixer, and other transmission circuitry and elements, and the receive antennas, as well as other receive circuitry, such as an LNA, a down conversion mixer, or other receive circuitry and elements, of each of the base station BS1 to BS3, should be separated from each other in each of the base stations BS1 to BS3. For example, within the base station BS1, the transmission circuitry and the receive circuitry are separated from each other. Accordingly, when performing transmit and receive beamforming, interference between the transmission circuitry and the receive circuitry of the base station BS1 may be suppressed due to the separation. The suppression of interference enables the base station BS1 to use a same timing and frequency resources for a transmit beam TXB1 and a receive beam RXB1 and their corresponding transmit and receive signals. However, the present invention is not limited thereto, and due to the separation between the transmission and receive circuitry, in performing the transmit and receive beamforming, a same timing using adjacent frequencies or two sets of frequencies that are very close to each other may be used.

According to an exemplary embodiment, two separate phase antenna arrays are used in each of the base stations BS1 to BS3. One of the phase antennas is used as a transmit antenna array, and the other of the phase antennas is used as a receive antenna array. These two antenna arrays are separated by a predetermined distance in order to reduce interference from a transmitted signal upon a received signal. The base stations BS1 to BS3 should also coordinate respective downlink and the uplink transmissions properly. For example, in the case of the base station BS1, the transmit beam TXB1 and the receive beam RXB2 are well separated in a spatial domain so as to further suppress the interference from the transmitted signal upon the received signal.

In order to coordinate the respective downlink and uplink transmissions, or in other words, to coordinate the transmit beamforming and the receive beamforming at a base station, such as the base station BS1, the base station BS1 requires downlink and uplink channel state information. A variety of methods may be used to acquire the downlink and uplink channel state information between the base station BS1 and one or more of the mobile stations MS1 to MS6 that are communicating with the base station BS1. For example, the base station BS1 may receive the downlink channel state information from one of the mobile stations MS1 to MS6, which may include information about a preferred downlink transmit beamforming among the downlink channel state information. The base station BS1 may configure one of the mobile stations MS1 to MS6 to transmit a sounding reference signal in the uplink channel so that the base station BS1 can derive the uplink channel state information, and uplink receive beamforming information, from the uplink sounding reference signal. According to another exemplary embodiment, in a TDD system having the transmit and receive antennas calibrated with each other, the base station may use the uplink channel state information as the downlink channel state information. Thus, in the TDD system, the mobile stations are not required to provide the downlink channel state information to the base station.

The downlink and uplink channel state information is then used to coordinate the downlink and uplink communications in order to perform SDD wireless communications. In addition to the downlink and uplink channel state in formation, other information, such as a buffer status, a quality of service measure, scheduling priorities, or other similar communication information may be used to coordinate the downlink and uplink communications. A base station, such as the base station BS1, determines a first mobile station, in this case the mobile station MS2, to transmit to at a predetermined time using a predetermined frequency. Thus, the base station BS1 determines the associated transmit beamforming, packet size, modulation and coding schemes, and other communications parameters for the downlink communications. The base station BS1 also determines a second mobile station, in the present case mobile station MS1, to receive from at a predetermined time using a predetermined frequency. Thus, the base station BS1 determines the associated receive beamforming, packet size, modulation and coding schemes, and other communications parameters for the uplink communications.

The determination of the transmit beamforming and the receive beamforming using a same time-frequency resource needs not occur at the same time. In other words, the base station BS1 may determine the receive beamforming, and a corresponding predetermined time and predetermined frequency, first. Subsequent to the first determination, the base station BS1 may then determine the transmit beamforming, and the same predetermined time and frequency as used for the receive beam forming. The base station can send a downlink grant to the mobile station MS2 and an uplink grant to the mobile station MS1 in order to coordinate the downlink and uplink communication. The downlink and the uplink grant messages may be transmitted different times. However, the present invention is not limited thereto, and the downlink and the uplink grant messages may be transmitted at the same time.

The mobile stations MS1 to MS6 operate in a half-duplex mode such that the mobile stations MS1 to MS6 only transmit or receive at any given time. In other words, the mobile stations MS1 to MS6, do not perform spatial beamforming when transmitting or receiving signals to or from the base stations BS1 to BS6. Thus, the mobile stations MS1 to MS6 respectively use only one antenna when both transmitting a signal to and receiving a signal from respective ones of the base stations BS1 to BS6. Therefore, by operating in the half-duplex mode, the mobile stations MS1 to MS6 can each use one antenna for both transmitting and receiving signals.

As shown in FIG. 9, the spatial beamforming includes each of the base stations BS1 to BS3 forming separated transmission and reception beams. The base station BS1 transmits data to the mobile station MS2 by enabling the transmit beam TxB1 in a direction towards the mobile station MS2. The mobile station MS2 receives the data transmitted from the base station BS1 by enabling the receive beam RxB1 in a direction towards the transmit antennas of the base station BS1 in order to receive the transmitted signal of the transmit beam TxB1.

Figure 5:
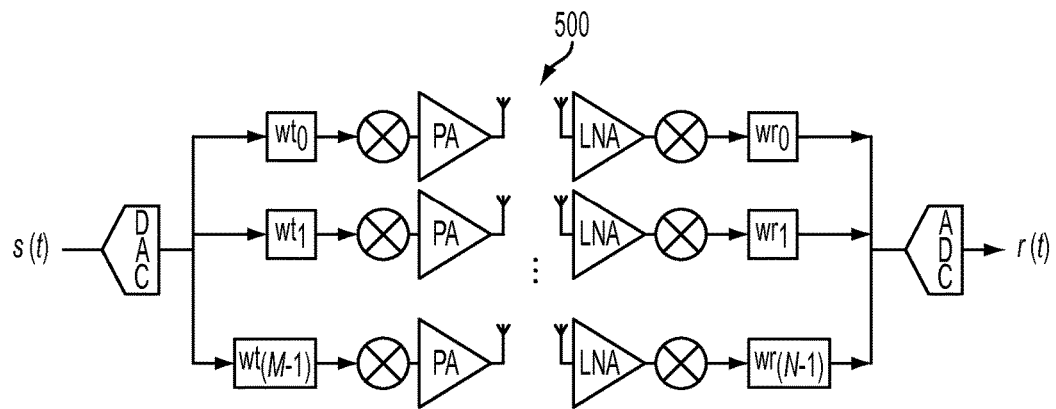
FIG. 5 illustrates an example of analog beamforming according to the related art.
Figure 6:
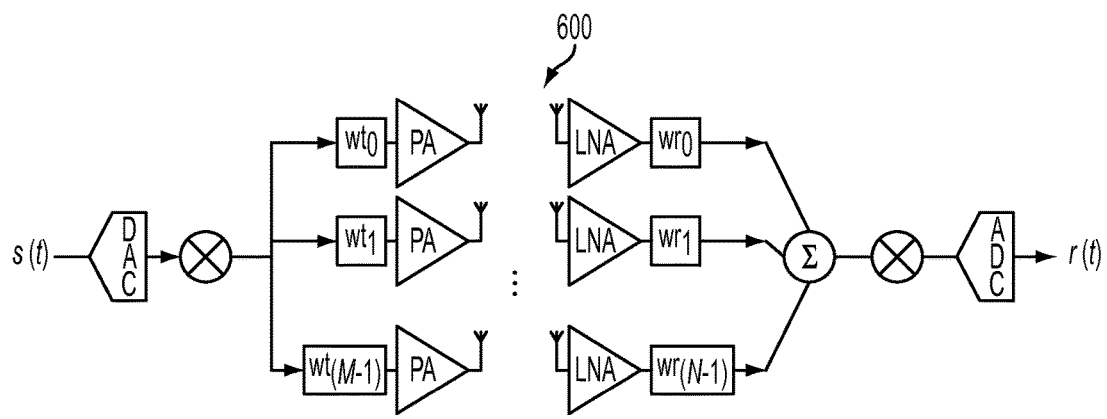
FIG. 6 illustrates an example of Radio Frequency (RF) beamforming according to the related art.

At a same time when the base station BS1 transmits data to the mobile station MS2 on a given frequency, the mobile station MS1 may transmit data to the base station BS1 on the same given frequency used by the base station BS1 to communicate with the mobile station MS1. The base station BS1 receives data from the mobile station MS1 by enabling a receive beam RxB2 in a direction towards the mobile station MS1. The mobile station MS1 transmits data to the base station BS1 by enabling a transmit beam TxB2 in a direction towards the base station BS1. In cell 1, as shown in FIG. 5, the transmit beam TxB1 does not substantially overlap with the transmit beam TxB2 and the receive beam RxB2. Also, in cell 1, the receive beam RxB2 does not substantially overlap with the transmit beam TxB1 and the receive beam RxB1. The base station BS1 applies beam forming to the transmit beam TxB1 and to the receive beam RxB2 so that they do not substantially overlap with each other with respect to a direction of propagation.

The base station BS2 transmits data to the mobile station MS3 by enabling a transmit beam TxB3 in a direction towards the mobile station MS3. At a same time, the base station BS2 receives data from the mobile station MS4 on a same frequency used to transmit data from the base station BS2 to the mobile station MS3. The base station BS2 receives data from the mobile station MS4 by enabling a receive beam RxB3 in a direction towards the mobile station MS4. In cell 2, the mobile stations MS3 and MS4 do not form any transmit or receive beams. Therefore, the mobile stations MS3 transmit signal transmitted on the transmit beam TxB3 may interfere with the mobile station MS4 receive signal received by the receive beam RxB3. However, if there is a sufficient spatial separation between the mobile stations MS3 and MS4, this interference may not be serious. The spatial separation between the mobile stations MS3 and MS4 allows for the base station BS2 to spatially separate the transmit beam TxB3 from the receive beam RxB3 by using beam forming.

The mobile station MS5 transmits data to the base station BS3 by enabling a transmit beam TxB4 in a direction towards the base station BS3. The base station BS3 receives data from the mobile station MS5 by enabling a receive beam RxB4 in a direction towards the mobile station MS5. At a same time the base station BS3 may transmit data to mobile station MS6 by enabling a transmit beam TxB5 in a direction towards the mobile station MS6. The spatial separation between the mobile stations MS5 and MS6 allows for the base station BS3 to spatially separate the transmit beam TxB4 from the receive beam RxB4 by using beam forming.

According to an exemplary embodiment of the present invention, in a millimeter wave mobile communication system, a first base station transmits a first signal while a second base station that is in the proximity of the said first base station is receiving a second signal on the same time-frequency resources. In other words, two proximate base stations may use the same frequency and time slots to respectively communicate with two different mobile stations. For example, referring to FIG. 5, the base station BS1 may transmit a first signal to the mobile station MS2 while the base station BS2 receives a second signal from the mobile station MS4 on the same frequency and at the same time as the first signal transmitted from the base station BS1 to the mobile station MS2. In other words, simultaneous transmission of a signal to the mobile station MS2 by the base station BS1 and receiving of another signal from the mobile station MS4 to the base station BS2 using the same frequency is possible.

The simultaneous transmission and receiving using the same frequency and time by different proximate base stations BS1 and BS2 is possible due to the strong directionality of the millimeter waves achieved by the beamforming operation at the base stations BS1 and BS2. Additionally, the base station BS1 may receive a third signal from the mobile station MS1 while the base station BS2 may transmit a fourth signal to the mobile station MS3, wherein the base station BS1 receives the third signal on the same frequency and at the same time as the base station BS2 transmits the fourth signal to the mobile station MS3. However, the present invention is not limited thereto, and in a millimeter wave mobile communication system any of a transmitter, a receiver, or both may perform the beamforming operation.

Figure 10:
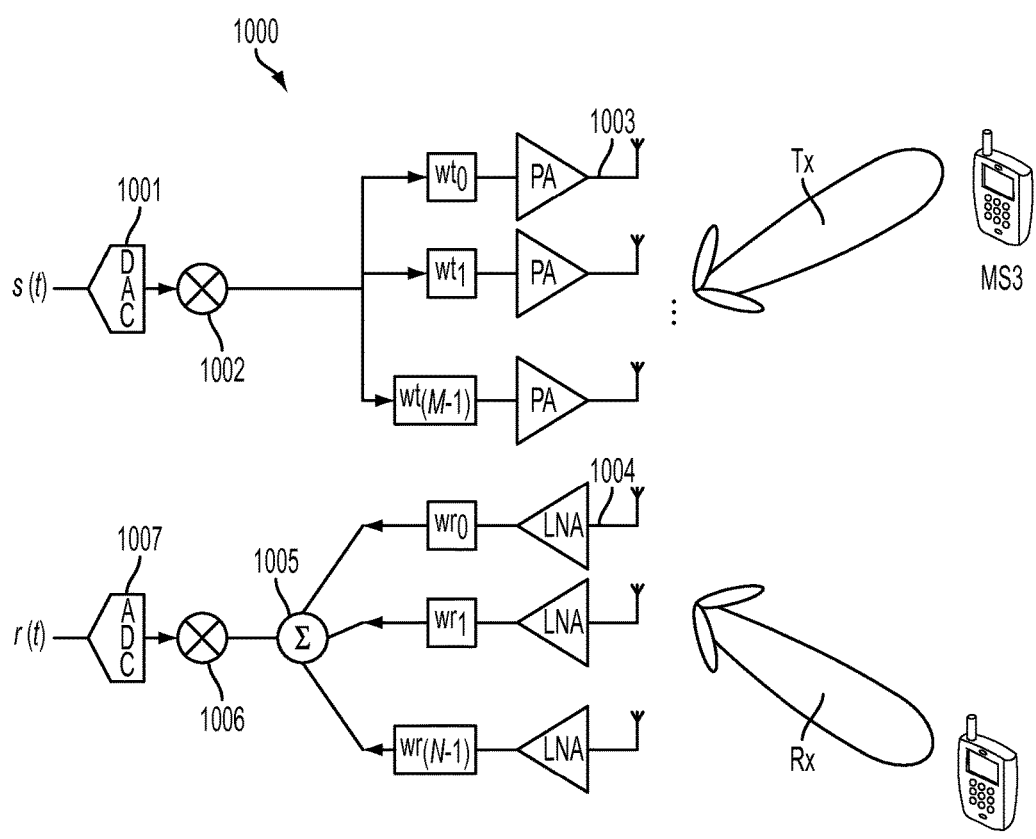
FIG. 10 illustrates transmit signal and receive signal separation by dynamic beamforming according to an exemplary embodiment of the present invention.

FIG. 10 illustrates transmit signal and receive signal separation by dynamic beamforming according to an exemplary embodiment of the present invention.

Referring to FIG. 10, a transceiver 1000 transmits a transmit signal to mobile station MS3 using a transmit beam TXB10 and receives a receive signal from mobile station MS4 using a receive beam RXB10.

According to the exemplary embodiment of FIG. 10, the transmit signal and the receive signal are separated from each other by dynamic beamforming. A digital form of the signal s(t) is transmitted along a transmit signal path to the DAC 1001 to convert the digital form of the signal s(t) into an analog form of the signal s(t). A mixer 1002 provides corresponding parts of the analog form of the signal s(t) to the respective ones of transmit antennas 1003. Transmit weights $wt_0$ to $wt_{(M-1)}$ are respectively applied to the corresponding parts of the analog form of the signal s(t) in order to form the transmit beam TXB10. The weighted corresponding part of the signal s(t) are then passed through respective Power Amplifiers PA in order to be transmitted from respective ones of the transmit antennas 1003 as the transmit beam TXB10. The transmit beam TXB10 transmits the transmit signal to the mobile station MS3.

The transceiver 1000 receives the receive signal from the mobile station MS4 via respective ones of the receive antennas 1004. Each receive signal path terminating at the respective ones of the receive antennas 1004 includes a Low Noise Amplifier LNA to amplify the received signal, which continues along the receive signal path and has receive weights $wr_0$ to $wr_{(N-1)}$ respectively applied in or to form the receive beam RXB10 in the beamformed shape, as shown in FIG. 10. The received signals are combined by a combiner 1005, mixed by a mixer 1006 and converted from an analog form of the signal into a digital form of the received signal r(t) by the ADC 1007. The transmit weights $wt_0$ to $wt_{(M-1)}$ and the receive weights $wr_0$ to $wr_{(N-1)}$, which are used for beamforming, are selected in order to maximize the transmit signal s(t) transmitted to the MS3 and to maximize the receive signal r(t) received from the mobile station MS4. Additionally, the transmit weights $wt_0$ to $wt_{(M-1)}$ and the receive weights $wr_0$ to $wr_{(N-1)}$ are selected in order to minimize interference between transmit beam TXB10 and the receive beam RXB10 at the transceiver 1000. Therefore, the transmit beamforming weights $wt_0$ to $wt_{(M-1)}$ and the receive weights $wr_0$ to $wr_{(N-1)}$ are chosen such that the transmit signal s(t) transmitted from the transceiver 1000 to the mobile station MS3 does not generate a prohibitive amount of interference with the receive signal r(t) received from the mobile station MS4.

Figure 11:
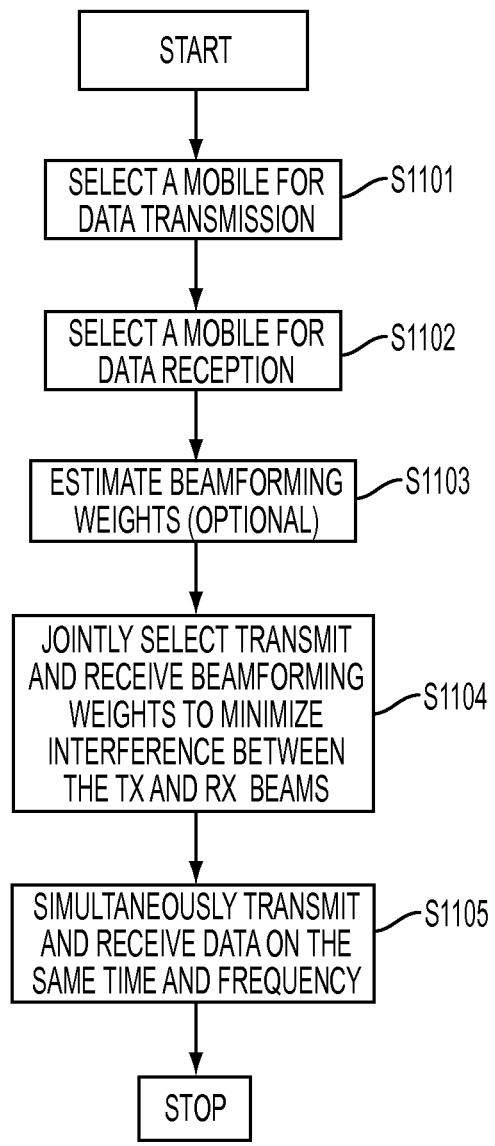
FIG. 11 is a flow chart illustrating transmit and receive beamforming weight adjustment according to an exemplary embodiment of the present invention.

FIG. 11 is a flow chart illustrating transmit and receive beamforming weight adjustment according to an exemplary embodiment of the present invention.

Referring to FIG. 11, in step S1101, a mobile station is selected to receive a data transmission from a data source. The data source may be a transceiver, a base station, a wireless terminal, or other similar electronic devices capable of transmitting a signal or performing a data transmission. Next, in step S1102, a mobile station is selected as the mobile station from data is received from. Beamforming weights, in step S1103, are estimated according to transmit and receive beamforming information and/or transmit and receive channel information. However, the present invention is not limited thereto, and the beamforming weights may be estimated according to other suitable information, or may be estimated to be predetermined weights, or may not be estimated and step S1103 may be not performed and skipped. Next, a transmit beamforming weight and a receive beamforming weight are selected in step 1104.

The transmit beamforming weight and the receive beamforming weight are jointly selected in step S1104. In other words, the transmit beamforming weight and the receive beamforming weight are selected at a same time so as to minimize interference between a transmit beam and a receive beam. However, the present invention is not limited thereto, and the transmit beamforming weight and the receive beamforming weight may be selected at different times. Net, in step 1105, transmit data and receive data are transmitted via the transmit beam and the receive beam, respectively. In step 1105, the transmitted transmit data is transmitted at a same time and a same frequency as the received receive data is received.

Figure 12:
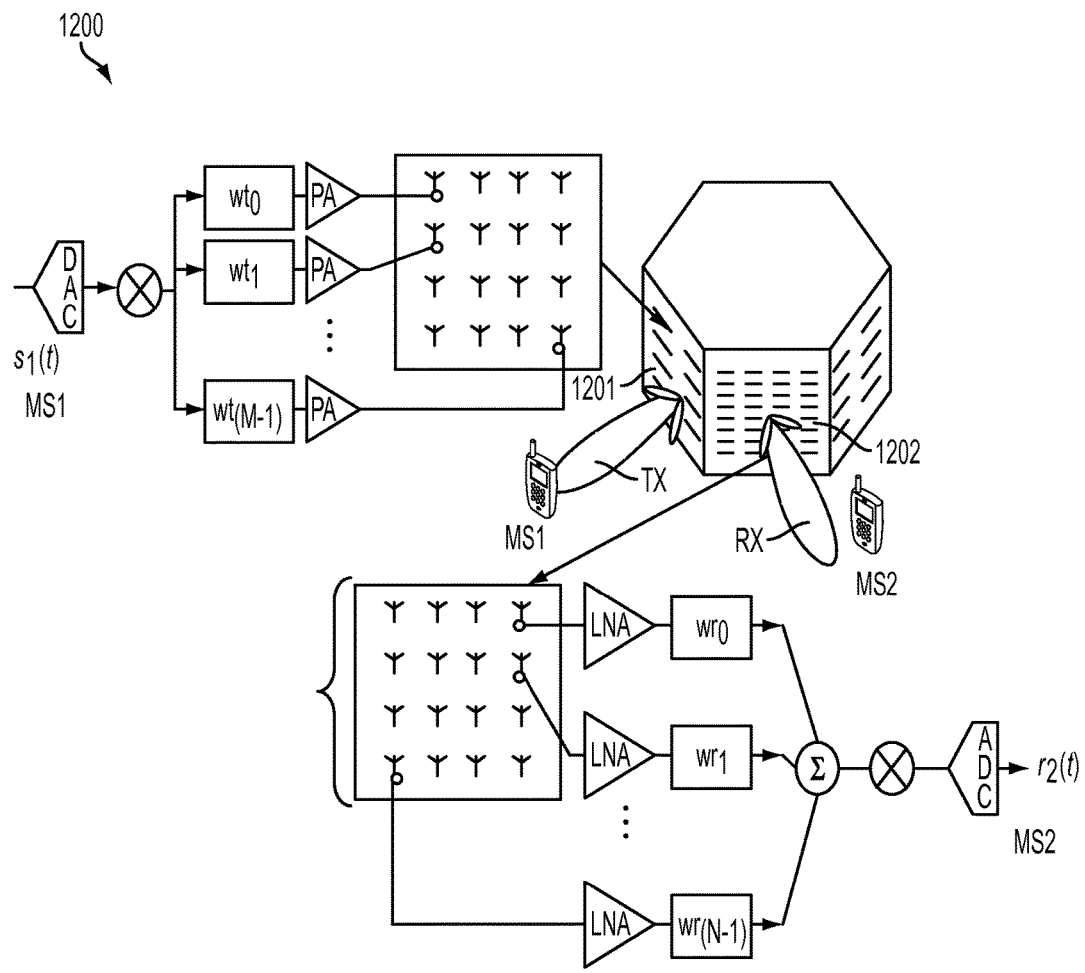
FIG. 12 illustrates an SDD system according to another exemplary embodiment of the present invention.

FIG. 12 illustrates an SDD system according to another exemplary embodiment of the present invention.

Referring to FIG. 12, a transceiver 1200 includes a transmit antenna array 1201 facing a first direction and a receive antenna array 1202 facing a second direction that is different than the first direction. For example, the transmit antenna array 1201 and the receive antenna array 1202 may be included as faces in a multi-faced antenna having a shape of a three-dimensional geometric shape, such as a hexagonal prism, a cube, a triangular prism, a pyramid or a variety of other suitable geometric shapes. In the exemplary embodiment of FIG. 12, a transmit signal $s_1(t)$ is transmitted to a mobile station MS1 from the transmit antenna array 1201 along the first direction in which the mobile station MS1 is disposed. A receive signal $r_2(t)$ is received from a mobile station MS2 by the receive antenna array 1202 facing the mobile station MS2 which is disposed along the second direction.

The transmit and receive antenna arrays 1201 and 1202 are two of six antenna array faces that are arranged in a hexagonal prism shape. As shown in FIG. 12, each of the antenna array faces covers approximately 60 degrees such that each section of an entire circumference around the transceiver 1200 has a corresponding antenna array face. However, the present invention is not limited thereto, and a number of degrees covered by each of the antenna array faces may be any suitable number of degrees corresponding to a geometric shape of the antenna array faces. A spatial orientation spacing between antenna array faces of the hexagonal prism shape, or other geometric shape, provides a spatial separation between the transmit signal $s_1(t)$ and the receive signal $r_2(t)$.

Figure 13:
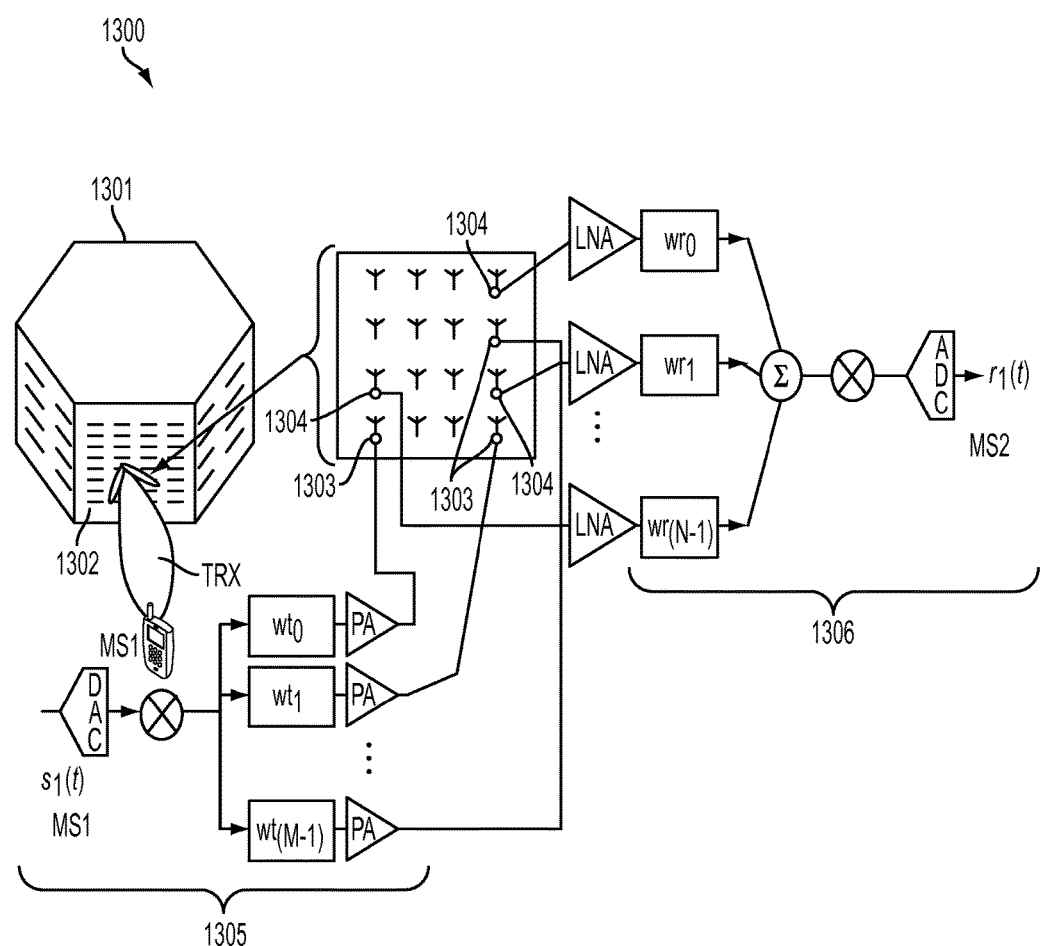
FIG. 13 illustrates an SDD system according to another exemplary embodiment of the present invention.

FIG. 13 illustrates an SDD system according to another exemplary embodiment of the present invention.

Referring to FIG. 13, a transceiver 1300 includes an antenna 1301 having multiple antenna array faces including a first antenna array face 1302. In the exemplary embodiment of FIG. 13, a transmit signal $s_1(t)$ is transmitted to a mobile MS1 using the first antenna array face 1302 and a receive signal $r_1(t)$ is received from the mobile station MS1 using the first antenna array face 1302. In other words, the transmit signal $s_1(t)$ is transmitted to the mobile station MS1 using a same antenna array face, namely the first antenna array face 1302, that is used to receive the receive signal $r_1(t)$ from the mobile station MS1.

In order to use the first antenna array face 1302 for both transmitting the transmit signal $s_1(t)$ to and receive the receive signal $r_1(t)$ from the mobile station MS1, the transceiver applies beamforming weights to respective antennas of the first antenna array face 1302. More particularly, both a transmitter 1305 and a receiver 1306 are connected to the first antenna array face 1302. The first antenna array face 1302 includes a plurality of antennas, some of which are used as transmit antennas 1303 and others of which are used as receive antennas 1304. In order to provide a spatial separation between a transmit signal and a receive signal of a transmit/receive beam TRXB directed towards the mobile station MS1, transmit beamforming weights $wt_1$ to $wt_{(M-1)}$ and receive beamforming weights $wr_1$ to $wr_{(N-1)}$ are respectively applied to the transmit antennas 1303 and the receive antennas 1304. Adjusting respective ones of the transmit beamforming weights $wt_1$ to $wt_{(M-1)}$ and the receive beamforming weights $wr_1$ to $wr_{(N-1)}$ allows for the transmit/receive beam TRXB to be spatially adjusted such that the transmit signal $s_1(t)$ can be spatially separated from the receive signal $r_1(t)$ within the transmit/receive beam TRXB.

Figure 14:
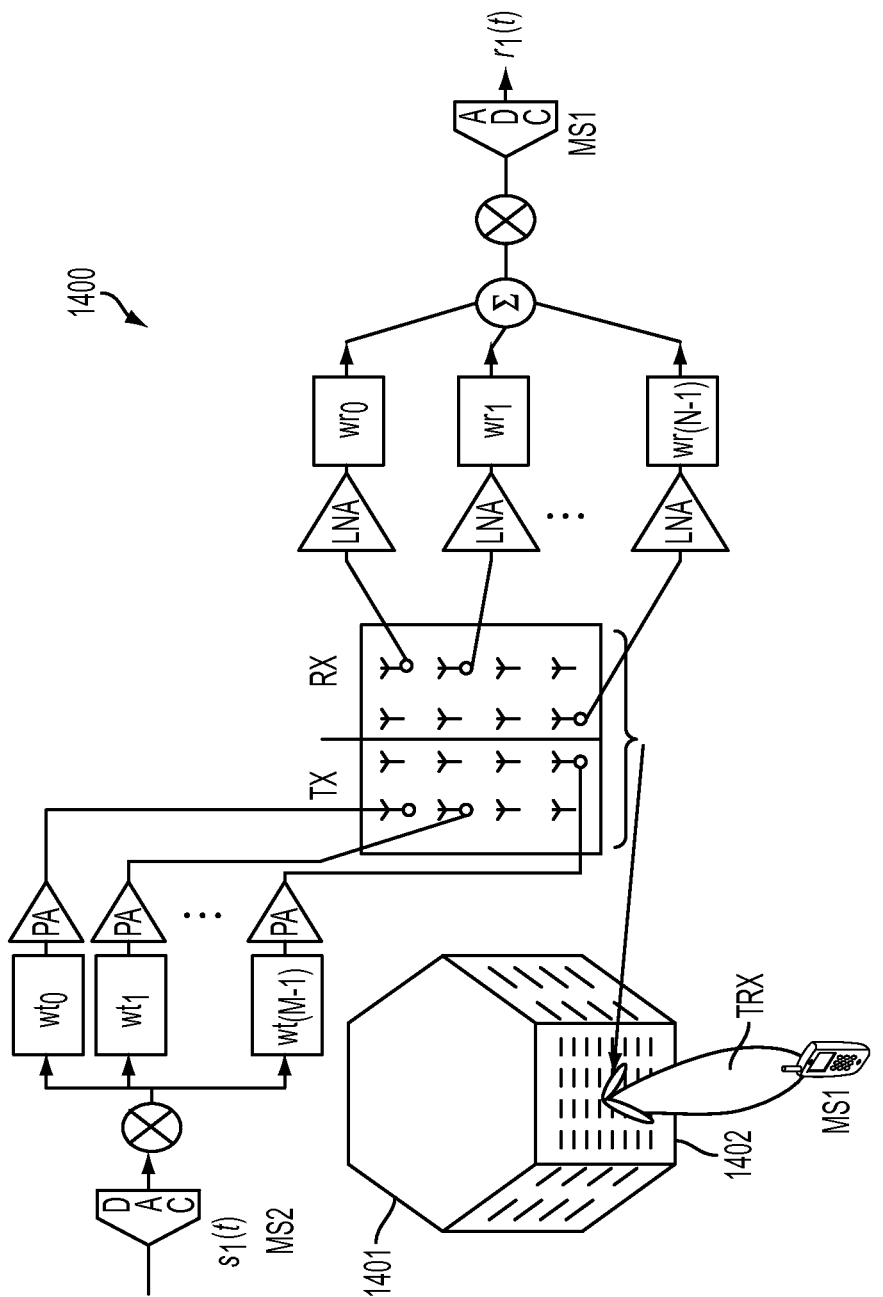
FIG. 14 illustrates an SDD system according to another exemplary embodiment of the present invention.

FIG. 14 illustrates an SDD system according to another exemplary embodiment of the present invention.

Referring to FIG. 14, a transceiver 1400 includes an antenna 1401 having a plurality of antenna arrays facing different directions, including a first antenna array face 1402 facing a first direction in which a mobile station MS1 is disposed. The first antenna array is divided into a transmit region TX for transmitting a transmit signal $s_1(t)$ and a receive region RX for receiving a receive signal $r_1(t)$. Accordingly, the transmit signal $s_1(t)$ and the receive signal $r_1(t)$ use different antenna elements which are respectively disposed in the transmit region TX and the receive region RX. Furthermore, the antennas of the transmit region TX and the receive region RX are spatially separated from each other such that respective antenna elements are not intermingled amongst one and other.

In the exemplary embodiment of FIG. 14, the transmit signal $s_1(t)$ is transmitted to a mobile station MS1 from the first antenna array face 1402 from the transmit region TX while the receive signal $r_1(t)$ is received from the same mobile station MS1 on the same first antenna array face 1402 at the receive region RX. A spatial separation between the transmit signal $s_1(t)$ and the receive signal $r_1(t)$ is achieved by adjusting transmit beamforming weights $wt0$ to $wt_{(M-1)}$ and receive beamforming weights $wr_0$ and $wr_{(N-1)}$ on respective transmit and receive antenna elements that are respectively disposed in the transmit region TX and the receive region RX on the same first antenna array face 1402.

Figure 15:
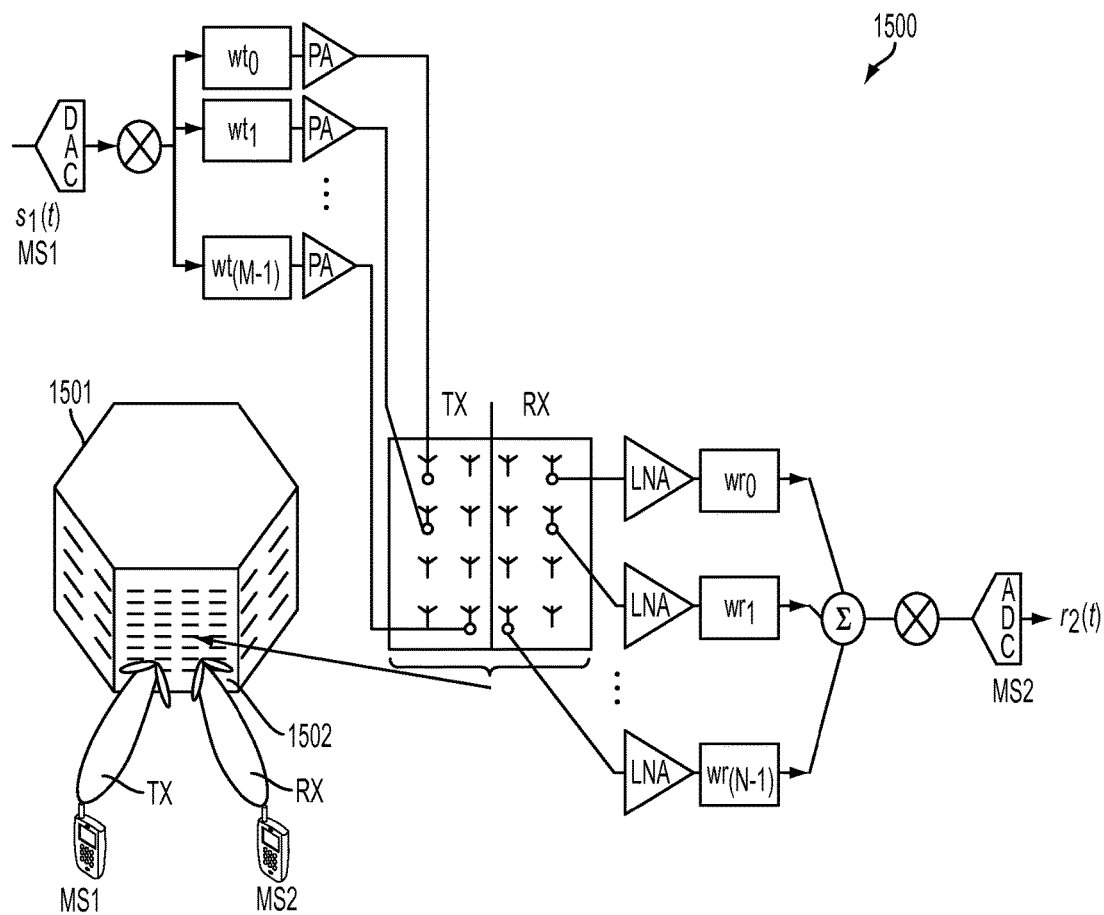
FIG. 15 illustrates an SDD system according to another exemplary embodiment of the present invention.

FIG. 15 illustrates an SDD system according to another exemplary embodiment of the present invention.

Referring to FIG. 15, a transceiver 1500, an antenna 1501 and a first antenna array face 1502 are similar to those as described with reference to the exemplary embodiment of FIG. 14. However, in the exemplary embodiment of FIG. 15, a transmit signal $s_1(t)$ and a receive signal $r_2(t)$ correspond to two different users, namely, a first mobile station MS1 and a second mobile station MS2. More particularly, a transmit beam TXB1 is directed towards the mobile station MS1 and a receive beam RXB1 is directed towards the mobile station MS2. However, both the transmit beam TXB1 and the receive beam RXB1 originate from the same first antenna array face 1502. However, the transmit beam TXB1 is formed using antenna elements disposed in a transmit region TX of the first antenna array face 1502 and the receive beam RXB1 is formed using antenna elements disposed in a receive region RX of the first antenna array 1502.

Accordingly, the first antenna array face 1502 may be used to simultaneously transmit the transmit signal $s_1(t)$ and receive the receive signal $r_2(t)$ respectively from two different users, the mobile stations MS1 and MS2. Beam forming is applied to the transmit beam TXB1 using transmit weights $wt_0$ to $wt_{(M-1)}$ and is also applied to the receive beam RXB1 using receive weights $wr_0$ to $wr_{(N-1)}$. By having the transmit region TX separated from the receive region RSX, interference between transmit and receive antennas is minimized due to the transmit and receive antenna elements being spatially separated from each other on respective left and right sides of the first antenna array face 1502. However, the present invention is not limited thereto and the transmit and receive antennas elements and the corresponding transmit region TX and receive region RX may be arranged or disposed in other suitable manners. For example, the transmit region TX may be disposed at a top part of the first antenna array face 1502 while the receive region RX may be disposed at a bottom part of the first antenna array face 1502.

Figure 16:
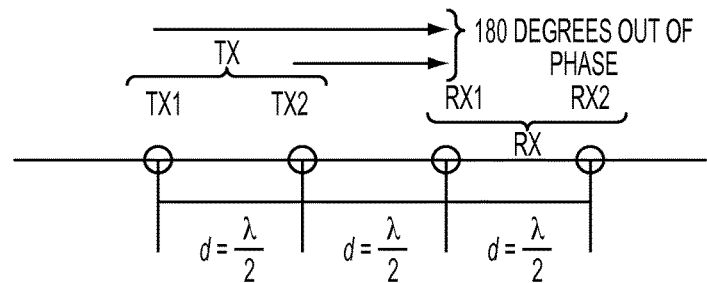
FIG. 16 illustrates an arrangement of antenna elements according to an exemplary embodiment of the present invention.

FIG. 16 illustrates an arrangement of antenna elements according to an exemplary embodiment of the present invention.

Referring to FIG. 16, transmit antenna elements TX and receive antenna elements RX are disposed in a predetermined arrangement so as to cancel transmit signals at the receive antenna elements RX. Each antenna element from among both the transmit antenna elements TX and the receive antenna elements RX are disposed so as to be spaced apart by a spacing distance d. In other words, as shown in FIG. 16, two transmit antenna elements TX1 and TX2 are disposed adjacent to each other at the spacing distance d, and two receive antenna elements RX1 and RX2 are disposed adjacent to each other at the spacing distance d. Also, the transmit antenna elements TX are disposed adjacent to the receive antenna elements RX at the spacing distance d. In order for the transmit signals to be cancelled at the receive antenna elements RX, the spacing distance d is one half the wavelength of the transmit signal. In other words, the spacing distance d is $\lambda/2$, wherein $\lambda$ is a wavelength of the transmit signal.

By having the spacing distance d be half of the transmit signal wavelength, a transmit signal transmitted from the transmit antenna elements TX signals arrives out of phase at the receive antenna elements RX. In further detail, by spacing two of the transmit elements TX at a spacing distance d of $\lambda/2$, respectively transmitted transmit signals, one from each of the two transmit elements TX, will be out of phase upon arriving at one of the receive antenna elements RX. Because the phase difference between the respectively transmitted transmit signals is 180 degrees at the one of the receive antenna elements RX, the transmitted transmit signals will cancel each other out, thereby eliminating interference with received signals at the receive antenna elements RX.

Figure 17:
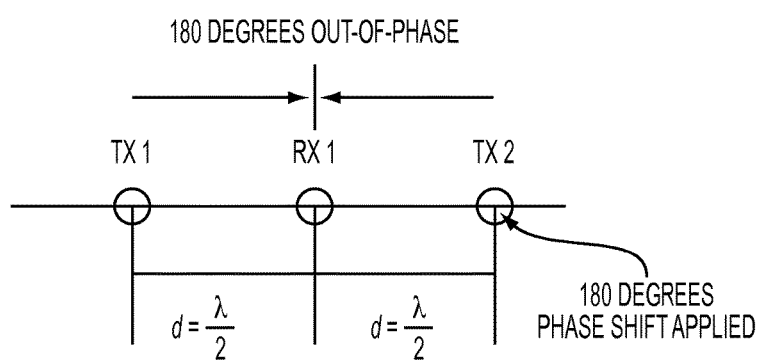
FIG. 17 illustrates an arrangement of antenna elements according to another exemplary embodiment of the present invention.

FIG. 17 illustrates an arrangement of antenna elements according to another exemplary embodiment of the present invention.

Referring to FIG. 17, a receive antenna element RX1 is disposed between a first transmit antenna element TX1 and a second transmit antenna element TX2. Each of the receive antenna element RX1 and the transmit antenna elements TX1 and TX2 are disposed apart from each other at a spacing distance d of $\lambda/2$, wherein $\lambda$ is a wavelength of a transmit signal transmitted from the transmit antenna elements TX1 and TX2. In order to mitigate interference from the transmit signal transmitted from the transmit antenna elements TX1 and TX2 with a receive signal received at the receive antenna element RX, a 180 degree phase shift (i.e., antenna weight) is applied to the transmit antenna element TX2, as shown in FIG. 17. Accordingly, when the transmit signals transmitted respectively from the transmit antenna elements TX1 and TX2, they are 180 degrees out of phase with each other and, thus, will cancel each other out when they are at the receive antenna element RX. However, aspects of the present invention is not limited thereto, and any suitable phase shift may be applied to any suitable transmit antenna element in order for the transmit signals to be cancelled out at a receive antenna element.

Figure 18:
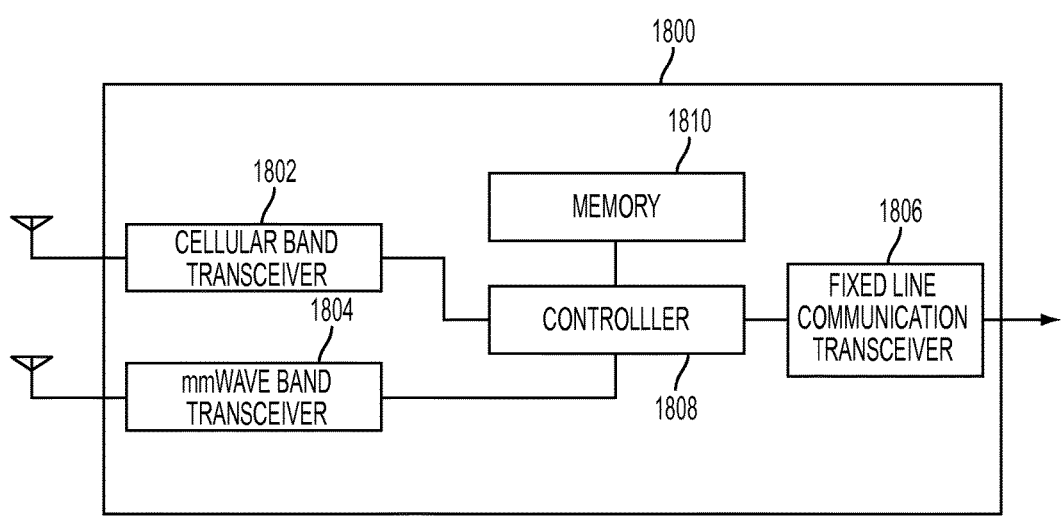
FIG. 18 is a block diagram illustrating a base station in a wireless communication system according to an exemplary embodiment of the present invention.

FIG. 18 is a block diagram illustrating a base station in a wireless communication system according to an exemplary embodiment of the present invention.

Figure 3:
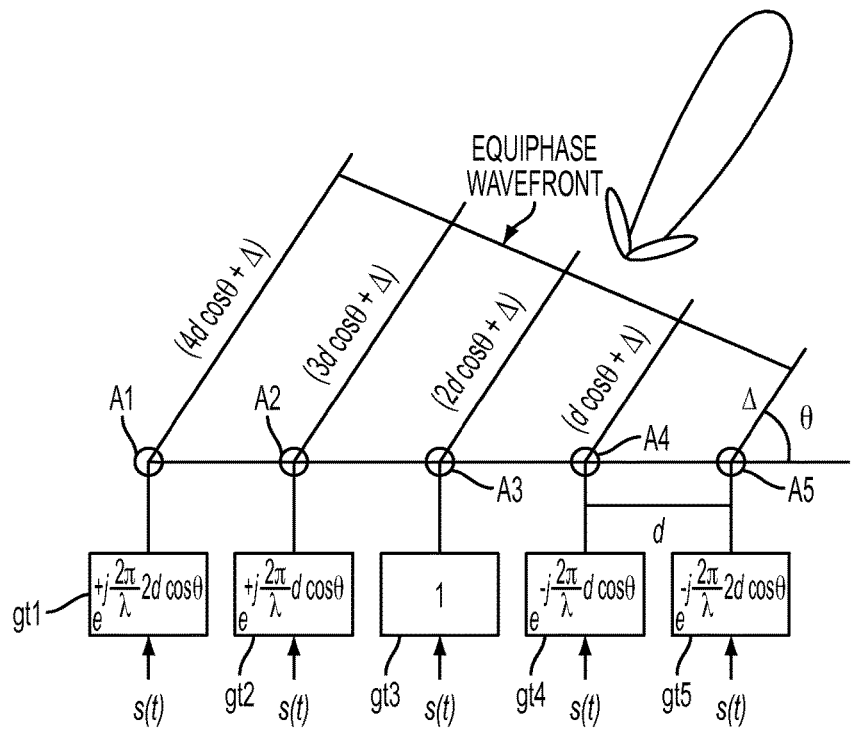
FIG. 3 illustrates dynamic beamforming according to the related art.
Figure 4:
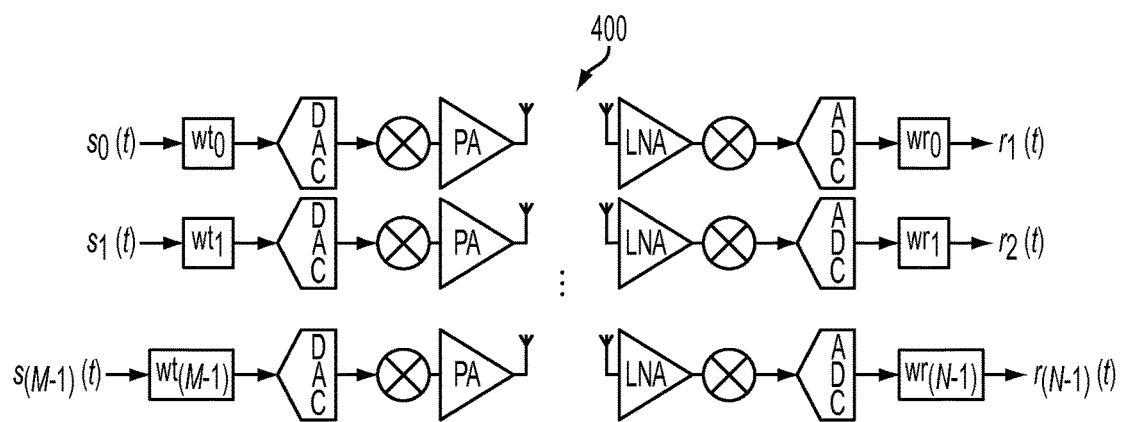
FIG. 4 illustrates an example of digital beamforming according to the related art.

Referring to FIG. 18, a base station 1800 includes a cellular band transceiver 1802, a millimeter wave band transceiver 1804, a fixed line communication transceiver 1806, a controller 1808, and a memory 1810. The base station 1800 may include any number of additional structural elements. However, a description of additional structural elements of the base station 1800 is omitted for conciseness. The base station 1800 may be used as a terminal as described with reference to FIGS. 3 and 4.

The cellular band transceiver 1802 includes an antenna system, a receiver, and a transmitter that operate in the cellular band. The antenna system is used to transmit signals to and receive signals from the air. The receiver converts a signal in the cellular band received through the antenna system into a baseband signal and demodulates the baseband signal. For example, the receiver may include a Radio Frequency (RF) processing block, a demodulation block, a channel decoding block and the like. The RF processing block converts a signal in the cellular band received through the antenna system into a baseband signal. The demodulation block may be comprised of a Fast Fourier Transform (FFT) operator for extracting data placed on each subcarrier from the signal received from the RF processing block and the like. The channel decoding block may comprise a demodulator, a deinterleaver, a channel decoder and the like. The transmitter converts a baseband signal into a signal in the cellular band and transmits the signal in the cellular band through an antenna system. For example, the transmitter may include a channel encoding block, a modulation block and an RF processing block. The channel encoding block may include a channel encoder, an interleaver, a modulator and the like. The modulation block may comprise an Inverse Fast Fourier Transform (IFFT) operator for placing transmitted data on a plurality of orthogonal subcarriers and the like. In an OFDM system, the modulation block may comprise the IFFT operator. In a Code Division Multiple Access (CDMA) system, the IFFT operator may be replaced with a code spreading modulator and the like. The RF processing block converts a baseband signal received from the modulation block into a signal in the cellular band and outputs the signal in the cellular band through the antenna system.

The millimeter wave band transceiver 1804 includes an antenna system, a receiver, and a transmitter that operate in the millimeter wave band. The antenna system is used to transmit signals to and receive signals from the air. The antenna system may have a transmit antenna array having transmit antennas and a receive antenna array having receive antennas. Herein, the antenna system may form one or more directional beams for communication in the millimeter wave band as described further above. The receiver converts a signal in the millimeter wave band received through the antenna system into a baseband signal and demodulates the baseband signal. For example, the receiver may include an RF processing block, a demodulation block, a channel decoding block and the like. The RF processing block converts a signal in the millimeter wave band received through the antenna system into a baseband signal. The demodulation block may be comprised of an FFT operator for extracting data placed on each subcarrier from the signal received from the RF processing block and the like. The channel decoding block may comprise a demodulator, a deinterleaver, a channel decoder and the like. The transmitter converts a baseband signal into a signal in the millimeter wave band and transmits the signal in the millimeter wave band through an antenna system. For example, the transmitter may include a channel encoding block, a modulation block and an RF processing block. The channel encoding block may include a channel encoder, an interleaver, a modulator and the like. The modulation block may comprise an IFFT operator for placing transmitted data on a plurality of orthogonal subcarriers and the like. In an OFDM system, the modulation block may comprise the IFFT operator. In a CDMA system, the IFFT operator may be replaced with a code spreading modulator and the like. The RF processing block converts a baseband signal received from the modulation block into a signal in the millimeter wave band and outputs the signal in the millimeter wave band through the antenna system.

The fixed line communication transceiver 1806 facilities fixed line communication with other network entities within a wireless communication system, such as other base stations, a Packet Data Server/Gateway, and a millimeter wave access point.

The controller 1808 controls overall operations of the base station 1800. The operations of the base station 1800 include any of the operations explicitly or implicitly described above as being performed by a base station. In addition, the controller 1808 generates data to be transmitted and process data to be received.

The memory 1810 stores programs used by controller 1808 for the operations of the base station 1800 and various data including any of the information and/or algorithms discussed herein as being received, transmitted, retained or used by a base station.

Figure 19:
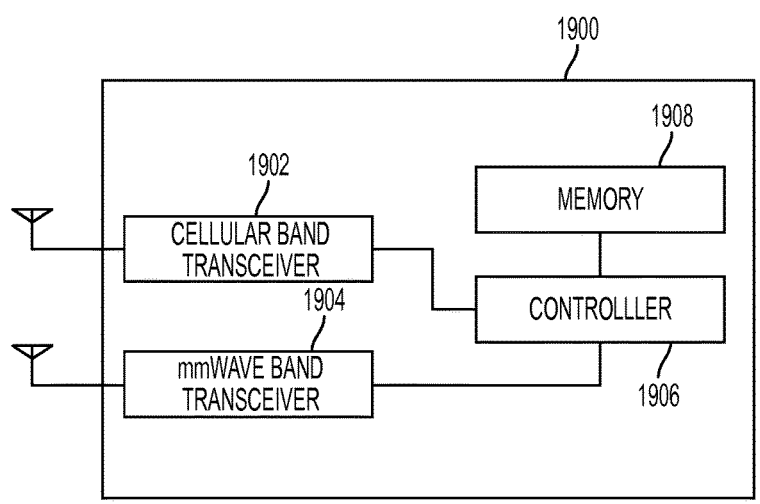
FIG. 19 is a block diagram illustrating a mobile station in a wireless communication system according to an exemplary embodiment of the present invention.

FIG. 19 is a block diagram illustrating a mobile station in a wireless communication system according to an exemplary embodiment of the present invention.

Referring to FIG. 19, the mobile station 1900 includes a cellular band transceiver 1902, millimeter wave band transceiver 1904, a controller 1906, and a memory 1908. The mobile station 1900 may include any number of additional structural elements. However, a description of additional structural elements of the mobile station 1900 is omitted for conciseness. The mobile station 1900 may be used as the wireless terminal as described with reference to FIG. 4.

The cellular band transceiver 1902 includes an antenna system, a receiver, and a transmitter that operate in the cellular band. The antenna system is used to transmit signals to and receive signals from the air. The receiver converts a signal in the cellular band received through the antenna system into a baseband signal and demodulates the baseband signal. For example, the receiver may include an RF processing block, a demodulation block, a channel decoding block and the like. The RF processing block converts a signal in the cellular band received through the antenna system into a baseband signal. The demodulation block may be comprised of an FFT operator for extracting data placed on each subcarrier from the signal received from the RF processing block and the like. The channel decoding block may comprise a demodulator, a deinterleaver, a channel decoder and the like. The transmitter converts a baseband signal into a signal in the cellular band and transmits the signal in the cellular band through an antenna system. For example, the transmitter may include a channel encoding block, a modulation block and an RF processing block. The channel encoding block may include a channel encoder, an interleaver, a modulator and the like. The modulation block may comprise an IFFT operator for placing transmitted data on a plurality of orthogonal subcarriers and the like. In an OFDM system, the modulation block may comprise the IFFT operator. In a CDMA system, the IFFT operator may be replaced with a code spreading modulator and the like. The RF processing block converts a baseband signal received from the modulation block into a signal in the cellular band and outputs the signal in the cellular band through the antenna system.

The millimeter wave band transceiver 1904 includes an antenna system, a receiver, and a transmitter that operate in the millimeter wave band. The antenna system is used to transmit signals to and receive signals from the air. Herein, the antenna system may form one or more directional beams for communication in the millimeter wave band as described further above. The receiver converts a signal in the millimeter wave band received through the antenna system into a baseband signal and demodulates the baseband signal. For example, the receiver may include an RF processing block, a demodulation block, a channel decoding block and the like. The RF processing block converts a signal in the millimeter wave band received through the antenna system into a baseband signal. The demodulation block may be comprised of an FFT operator for extracting data placed on each subcarrier from the signal received from the RF processing block and the like. The channel decoding block may comprise a demodulator, a deinterleaver, a channel decoder and the like. The transmitter converts a baseband signal into a signal in the millimeter wave band and transmits the signal in the millimeter wave band through an antenna system. For example, the transmitter may include a channel encoding block, a modulation block and an RF processing block. The channel encoding block may include a channel encoder, an interleaver, a modulator and the like. The modulation block may comprise an IFFT operator for placing transmitted data on a plurality of orthogonal subcarriers and the like. In an OFDM system, the modulation block may comprise the IFFT operator. In a CDMA system, the IFFT operator may be replaced with a code spreading modulator and the like. The RF processing block converts a baseband signal received from the modulation block into a signal in the millimeter wave band and outputs the signal in the millimeter wave band through the antenna system.

The controller 1906 controls overall operations of the mobile station 1900. The operations of the mobile station 1900 include any of the operations explicitly or implicitly described above as being performed by a mobile station. In addition, the controller 1906 generates data to be transmitted and process data to be received.

The memory 1908 stores programs used by controller 1906 for the operations of the mobile station 1900 and various data including any of the information and/or algorithms discussed herein as being received, transmitted, retained or used by a mobile station.

Although exemplary embodiments are disclosed using base stations and mobile stations, the present invention is not limited thereto. Aspects of the present invention may be applied by a person of ordinary skill of the art to other mobile and/or wireless communication technology using advanced system topologies and devices, such as relay communication among base stations, direct communication among mobile stations, and various implementation of cooperative communication.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A wireless terminal for a full-duplex millimeter wave communication system, the wireless terminal comprising:
   a transmit antenna array having a plurality of transmit antennas configured to form a spatially beamformed transmit beam to transmit communication signals to a remote terminal; and
   a receive antenna array having a plurality of receive antennas configured to form a spatially beamformed receive beam to receive communication signals from the remote terminal,
   wherein the plurality of transmit antennas and the plurality of receive antennas use a same frequency to simultaneously transmit the communication signals of the transmit beam to the remote terminal and receive the communication signals of the receive beam from the remote terminal, and
   wherein transmit beamforming weights for the plurality of transmit antennas and receive beamforming weights for the plurality of receive antennas are jointly selected, and
   wherein the wireless terminal is configured to provide feedback information regarding at least one preferred transmit beam.

2. The wireless terminal of claim 1,
   wherein the transmit beamforming weights are applied to the transmit antennas in order to form the spatially beamformed transmit beam,
   wherein the receive beamforming weights are applied to the receive antennas in order to form the spatially beamformed transmit beam, and
   wherein the transmit and receive beamforming weights are selected to reduce interference between the spatially beamformed transmit and receive beams simultaneously using the same frequency to transmit the communication signals of the transmit beam to the remote terminal and receive the communication signals of the receive beam from the remote terminal.

3. The wireless terminal of claim 2,
   wherein the transmit beamforming weights are not all equal to each other, and
   wherein the receive beamforming weights are not all equal to each other.

4. The wireless terminal of claim 2,
   wherein the transmit beamforming weights adjust a phase of the communication signal of the transmit beam, and
   wherein the receive beamforming weights adjust a phase of the communication signal of the receive beam.

5. The wireless terminal of claim 2, wherein the transmit beamforming weights and the receive beamforming weights are adjusted such that the beamformed transmit beam and the beamformed receive beam do not substantially spatially overlap.

6. The wireless terminal of claim 5, wherein uplink channel information is received from a wireless terminal receiving the communication signal of the transmit beam.

7. The wireless terminal of claim 2, wherein the transmit beamforming weights and the receive beamforming weights are adjusted such that the beamformed transmit beam and the beamformed receive beam do not substantially interfere with each other.

8. The wireless terminal of claim 2,
   wherein the transmit beamforming weights are calculated according to uplink channel information, and wherein the receive beamforming weights are calculated according to downlink channel information.

9. The wireless terminal of claim 2, wherein the transmit beamforming weights and the receive beamforming weights are calculated at a same time.

10. The wireless terminal of claim 2, wherein the transmit beamforming weights and the receive beamforming weights are calculated at different times.

11. The wireless terminal of claim 1,
wherein the plurality of transmit antennas and the plurality of receive antennas are arranged in respective L by N matrices,
wherein L is a number of antennas arranged in a first direction, and
wherein N is a number of antennas arranged in a second direction that is perpendicular to the first direction.

12. The wireless terminal of claim 11,
wherein a distance between each one of the plurality of transmit antennas is approximately one half of a wavelength of the communication signal, and
wherein a distance between each one of the plurality of receive antennas is approximately one half of the wavelength of the communication signal.

13. The wireless terminal of claim 12, wherein a distance between adjacent ones of the transmit antennas and the receive antennas is approximately one half of a wavelength of the communication signal.

14. The wireless terminal of claim 1, wherein the transmit antenna array and the receive antenna array face different directions.

15. The wireless terminal of claim 1, wherein the transmit antenna array and the receive antenna array face a same direction.

16. The wireless terminal of claim 15, wherein the transmit antennas and the receive antennas are intermixed on an antenna array including both the transmit antenna array and the receive antenna array.

17. The wireless terminal of claim 15,
wherein the transmit antennas are formed in a transmit area and the receive antennas are formed in a receive area, and
wherein the transmit area and the receive area are disposed on an antenna array including both the transmit antenna array and the receive antenna array.

18. The wireless terminal of claim 17, wherein the transmit area and the receive area are adjacent to each other on the antenna array.

19. The wireless terminal of claim 1, wherein the wireless terminal uses a selected number of the plurality of transmit antennas to form the spatially beamformed transmit beam.

20. The wireless terminal of claim 1, wherein the wireless terminal uses a selected number of the plurality of receive antennas to form the spatially beamformed receive beam.

21. The wireless terminal of claim 1,
wherein the wireless terminal transmits more than one transmit beam at a same time using a same frequency,
wherein each of the more than one transmit beam is spatially separated from each other, and
wherein the more than one transmit beam uses respective ones of the plurality of transmit antennas to form the spatially separated more than one transmit beam.

22. The wireless terminal of claim 1, wherein the wireless terminal engages in full-duplex communication with another wireless terminal using a same frequency at a same time.

23. The wireless terminal of claim 1, wherein the wireless terminal comprises a Base Station (BS).

24. The wireless terminal of claim 1, wherein the wireless terminal comprises a Mobile Station (MS).

25. A Spatial Division Duple (SDD) mobile communication system using millimeter waves, the SDD mobile communication system comprising:
a first wireless terminal comprising:
a first transmit antenna array having a plurality of first transmit antennas configured to transmit a spatially beamformed first transmit beam; and
a first receive antenna array having a plurality of first receive antennas configured to form a spatially beamformed first receive beam,
wherein the first transmit antenna array and the first receive array are spatially configured by jointly selected transmit and receive beamforming weights; and
a second wireless terminal comprising:
a second transmit antenna array having a plurality of second transmit antennas configured to transmit a spatially beamformed second transmit beam directed towards a receive beam of the first wireless terminal; and
a second receive antenna array having a plurality of second receive antennas configured to form a spatially beamformed second receive beam directed toward a transmit beam of the first wireless terminal,
wherein the second transmit antenna array and the second receive antenna array are spatially configured by jointly selected transmit and receive beamforming weights, and
wherein the first transmit antennas and the first receive antennas use a same frequency and a same timing to simultaneously transmit communication signals of the first transmit beam to the second receive beam and receive communication signals of the second transmit beam at the first receive beam.

26. The SDD mobile communication system of claim 25, wherein the first and second transmit beams and the first and second receive beams do not overlap.

27. The SDD mobile communication system of claim 25, wherein the first wireless terminal and the second wireless terminal communicate with each other using full-duplex communication.

28. The SDD mobile communication system of claim 25, wherein one of the first wireless terminal and the second wireless terminal communicate with another wireless terminal using the same frequency at the same time through respective one of the first and second transmit beams and respective one of the first and second receive beams.

29. The SDD mobile communication system of claim 25, wherein the first and second wireless terminals each have a transmit antenna array and a receive antenna array using beamforming to communicate with the second and first wireless terminals, respectively.

30. The SDD mobile communication system of claim 25, wherein the first and second wireless terminals communicate with the second and first wireless terminals, respectively, using one of a full-duplex communication scheme and a half-duplex communication scheme.

31. The SDD mobile communication system of claim 25,
wherein the first and second transmit antennas and the first and second receive antennas are arranged in respective L by N matrices,
wherein L is a number of antennas arranged in a first direction, and
wherein N is a number of antennas arranged in a second direction that is perpendicular to the first direction.

32. The SDD mobile communication system of claim 31, wherein a distance between each of the transmit antennas is approximately one half of a wavelength of a communication signal, and
wherein a distance between each of the receive antennas is approximately one half of the wavelength of the communication signal.

33. The SDD mobile communication system of claim 25, wherein each of the first wireless terminal and second wireless terminal uses a selected number of the plurality of respective first and second transmit antennas to form the respective first and second transmit beams.

34. The SDD mobile communication system of claim 25, wherein each of the first wireless terminal and second wireless terminal uses a selected number of the plurality of respective first and second receive antennas to form the spatially beamformed respective first and second transmit beams.

35. The SDD mobile communication system of claim 25,
wherein each of the first wireless terminal and second wireless terminal transmits more than one respective first and second transmit beams at one time using a same frequency at a same time,
wherein the more than one respective first and second transmit beams are spatially separated from each other, and
wherein the more than one respective first and second transmit beams use respective one of the first and second transmit antennas to form the spatially separated first and second transmit beams.

36. The SDD mobile communication system of claim 25, wherein the first and second wireless terminals engage in full-duplex communication with the second and first wireless terminals, respectively, using the same frequency at the same time.

37. A method for Spatial Division Duplex (SDD) mobile communications using millimeter waves, the method comprising:
forming a first transmit beam using selected ones of a plurality of transmit antennas of a transmit antenna array;
transmitting a first signal to a first wireless terminal via the first transmit beam according to a predetermined frequency at a predetermined time;
forming a first receive beam using selected ones of a plurality of receive antennas of a receive antenna array; and
receiving a second signal from a second wireless terminal via the first receive beam according to the predetermined frequency at the predetermined time,
wherein transmit and receive beamforming weights for each of the first transmit beam and the first receive beam are jointly selected for simultaneously using the predetermined frequency to transmit the first signal via the first transmit beam to a remote terminal and receive the second signal via the receive beam from the remote terminal.

38. The method of claim 37, further comprising:
forming a second transmit beam using selected ones of the plurality of transmit antennas of the transmit antenna array;
transmitting a third signal to the first wireless terminal via the second transmit beam according to a predetermined frequency at a predetermined time;
forming a second receive beam using selected ones of the plurality of receive antennas of the receive antenna array; and
receiving a fourth signal from the second wireless terminal via the second receive beam according to the predetermined frequency at the predetermined time,
wherein each of the second transmit beam and the second receive beam is spatially beamformed to suppress interference, and
wherein the spatially beamformed second transmit beam and the spatially beamformed second receive beam do not spatially overlap.

39. The method of claim 38, wherein the transmitted first signal, the received second signal, the transmitted third signal and the received fourth signal are respectively transmitted and received according to a full-duplex scheme.

* * * * *